(12) United States Patent
Hayashi

(10) Patent No.: US 7,190,466 B2
(45) Date of Patent: Mar. 13, 2007

(54) INSPECTION DEVICE OF A TAPE REEL

(75) Inventor: Yoichi Hayashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 419 days.

(21) Appl. No.: 10/601,677

(22) Filed: Jun. 24, 2003

(65) Prior Publication Data

US 2004/0004729 A1    Jan. 8, 2004

(30) Foreign Application Priority Data

Jun. 25, 2002 (JP) ............................. 2002-184306
Aug. 12, 2002 (JP) ............................. 2002-235111

(51) Int. Cl.
  *G01B 11/14*  (2006.01)
(52) U.S. Cl. ...................... 356/622; 242/534
(58) Field of Classification Search ................ 356/622, 356/327.2, 238.2, 139.1; 269/28
  See application file for complete search history.

(56) References Cited

U.S. PATENT DOCUMENTS 5,739,904 A * 4/1998 Berger et al. ............ 356/238.2

FOREIGN PATENT DOCUMENTS

DE     19514718 A1 * 10/1996
JP     6-231452       8/1994

* cited by examiner

*Primary Examiner*—Layla G. Lauchman
*Assistant Examiner*—Juan D. Valentin, II
(74) *Attorney, Agent, or Firm*—Sughrue Mion, PLLC

(57) ABSTRACT

An inspection device of a tape reel comprises a first inspection device 10 consisting of a light projector 11, a mirror 12, and a light receiver 13, a second inspection device 20 consisting of a light projector 21, a mirror 22, and a light receiver 23, and a rotator 30 that rotates a tape reel 40, and parallel lights R1, R2 irradiated from the light projector 11 are reflected by the mirror 12, to be made incident on inner surfaces of flanges 42, 43 of the tape reel 40, whereas parallel lights R3, R4 irradiated from the light projector 21 are reflected by the mirror 22 to be made incident on the inner surfaces of the flanges 42, 43 of the tape reel 40, and parallel lights R1 to R4 that pass the inner surfaces of the flanges 42, 43 are received by the light receiver 13 or the light receiver 23. Thereby, an inspection device capable of inspecting a position of each flange of the tape reel, distance between flanges, and an inclined angle of each flange in a un-contact state accurately at high speed, an inspection method for the same, and a positioning device of a member to be positioned capable of positioning the position of the flange accurately are provided.

2 Claims, 16 Drawing Sheets

INSPECTION DEVICE OF A TAPE REEL

TECHNICAL FIELD OF THE INVENTION

The present invention relates to an inspection device of a tape reel and an inspection method for the same, especially relates to an inspection device for inspecting a dimension accuracy of a flange in a tape reel in which a pair of disk-shaped flanges are fixed in a mutually facing manner on both ends of a cylindrical hub, and an inspection method for the same.

BACKGROUND OF THE INVENTION

Conventionally, a magnetic tape serving as a magnetic recording medium is widely used as a recording medium used for other record reproducing devices such as an audio device and a video device. Generally various films, such as a magnetic tape, a movie film, and an X ray film, are wound on the tape reel as shown in FIGS. 1 and 2 to be held. FIG. 1 is a perspective view showing one example of the tape reel. Also, FIG. 2 is a sectional view taken along the line A—A in FIG. 1.

As shown in FIG. 1, a tape reel 40 is constituted including a cylindrical hub 41 having tape T wound thereon on outer peripheral surface, and one pair of disk-shaped lower flange 42 and upper flange 43 fixed to a lower end 41a and an upper end 41b of the hub 41. In addition, the upper flange 43 is fabricated from a transparent material in many cases so that a winding appearance and a winding volumes of the tape T wound on the hub 41 can be checked visibly.

As shown in FIG. 2, the lower flange 42 and the upper flange 43 are brought into contact with tape edge E1 of upper side and tape edge E2 of lower side of the tape T wound on the hub 41. And the position of the tape edge E1 and or E2 is controlled, to thereby control the movement of the tape in a width direction of the tape T. In FIG. 2, an inner surface 42a of the lower flange 42 is brought into contact with the tape edge E2 of the lower side of the tape T, and control the position of the tape edge E2 of the lower side, to thereby control the movement of the tape T in the width direction. This enables a stable traveling of the tape T, and consequently the record reproducing feature of the tape T can be maintained good.

In addition, inner surface 42a of the lower flange 42, and inner surface 43a of the upper flange are formed in inclined surfaces which are inclined from inner peripheral side (left-hand side in the drawing), at a predetermined angle toward the outer surfaces 42b and 43b of the flanges 42 and 43. Thus, the inner surfaces 42a and 43a of the flanges 42 and 43 are formed in inclined surfaces, to thereby make it easy for the tape T wound on outer periphery of the hub 41 to come out from between flanges 42 and 43, when feeding out the tape T from the tape reel 40. Also, when un-winding the tape T on the tape reel 40, the tape T easily enters into between flanges 42 and 43. This allows the tape T to travel stably when feeding out the tape T from the tape reel 40, and taking up the tape T on the tape reel 40.

As shown in FIG. 3, the tape reel 40 is fabricated using resin as a material in such a manner that the upper flange 43 fabricated separately is bonded to upper end 41b of the hub 41 integrally fabricated with the lower flange 42, by welding or adhesives. FIG. 3 shows the manufacturing process of the tape reel 40 in which the upper flange 43 is bonded to the upper end 41b of the hub 41 integrally fabricated with the lower flange 42, to thereby manufacture the tape reel 40. However, in manufacturing the tape reel 40, the upper flange 43 and the hub 41 are integrally fabricated with the upper flange 43 beforehand, then the lower flange 42 may be bonded to the lower edge 41b of the hub 41.

By the way, in recent years, higher recording density and higher speed of a tape are progressing, therefore stable traveling of the tape is further required. In the tape reel 40 as shown in FIG. 1 and FIG. 2, high dimension accuracy of the position of the flanges 42 and 43, distance between the flanges 42 and 43, and inclined angles of the inner surfaces 42a and 43a of the flanges 42 and 43 is required. Therefore, after manufacturing the tape reel 40, it is necessary to inspect the dimension accuracy of the the position of flanges 42 and 43, the distance between flanges 42 and 43, and the inclined angles of the inner surfaces 42a and 43a of the flanges 42 and 43 respectively.

Also, generally, in case that the flanges are welded to the hub, to thereby form a reel, or two sheets of disks are mutually laminated, to thereby form one sheet of disk, the hub and the disk of positioning side are engaged with guide pins for positioning. In this state, the flanges and disks are welded or bonded. However, in order to improve the accuracy of the positioning by tight engagement of the hub and the disk, a problem is involved therein in such a way that it is easily damaged by an unreasonable handling. For this reason, a positioning device that performs positioning by grasping the flange by a clamp is proposed. (For example see JP-A-06-231452).

However, in the conventional needle contact type measuring method, error of μm order is generated by slight contact pressure of the probe needle, thereby involving a problem that the size of the μm order of an object to be measured cannot be measured. Moreover, more problems are involved therein in such a way that an object to be measured is damaged by the probe which is contacted with the object to be measured one by one, or time required for measurement is longer compared with an optical measuring method that measures in an un-contacting state. In addition, when a miniaturized tape reel is inspected in order to hold a tape with narrow width, distance between flanges becomes short. Thereby it becomes difficult to insert the probe between flanges.

On the other hand, in the conventional optical measuring method, inspection light is irradiated on the surface of a target object, so as to receive the reflected light. Therefore, there is raised a problem that the position of the flanges 42, 43, the distance between the flanges 42, 43, and the inclined angle of the inner surfaces 42a, 43a cannot be measured.

Here, a method for inserting a reflective sensor or a mirror between the flanges 42 and 43 is conceivable, however involving a problem that the structure of the inspection device is complicated. Especially, the dimension accuracy of the position of the flanges 42, 43, the distance between the flanges 42, 43, and the inclined angles of the inner surfaces 42a, 43a are inspected immediately after manufacture of the tape reel 40, therefore the inspection device is required to be arranged on the manufacturing process of the tape reel 40. However, if the reflective sensor or the mirror is interposed between the flanges 42 and 43, there is posed problems such as, (1) the constitution of the inspection device is complicated, therefore it becomes difficult to arrange the inspection device on the manufacturing process of the tape reel 40; (2) there is a possibility that the flange 42, and the reflective type sensor and mirror which are interposed between the flanges 42 and 43, may collide with the upper flange 42 or the lower flange 43, and may be damaged; (3) when the upper flange 43 is fabricated from a transparent material, the inspection light irradiated onto the inner surface 43a of the upper flange 43 penetrates the upper flange 43 which is transparent material, and cannot receive a reflected light, or it is reflected by the inner surface 43a of the upper flange 43 which is a transparent material, involving an error.

Moreover, the positioning device that performs positioning by grasping the flange by the clamp poses further problems that the number of parts is increased as a mechanism is complicated, raising a failure ratio and price.

Also, when inspecting the tape reel, the positioning of the position of the flanges of the tape reel must be performed accurately, so that a commodity value of a tape may not fall. Therefore, it is required that the accurate positioning of the position of the flanges is improved even more.

SUMMARY OF THE INVENTION

Hereupon, an object of the present invention is to provide an inspection device capable of inspecting the position of each flange of a tape reel, distance between flanges, and an inclined angle of inner surface of each flange in an un-contacting state correctly and at high speed. Also, the object of this invention is to provide a positioning device of a member to be positioned capable of positioning of the position of the flanges accurately.

The inspection device of this invention is the inspection device for measuring the position of the measuring point set up on the curved surface of an object to be measured, and inspecting the dimension accuracy of the object to be measured, comprising a light projector that irradiates a parallel light that is made incident along the measuring point on the curved surface, and a light receiver that receives the parallel light that passes the measuring point, and obtains the position of the measuring point based on the receiving position of the parallel light.

An inspection device of this invention is an inspection device for inspecting the dimension accuracy of the position of each flange in inner diameter side or outer diameter side of the flanges, distance between flanges, and an inclined angle of the inner surface of each flange, said inspection device comprising:

A rotator that rotates the tape reel in the peripheral direction of the flanges centering on the hub;

A first light projector that irradiates a first parallel light that passes a first measuring point set up in inner diameter side of one of the flanges, and a second parallel light that passes a second measuring point set up on inner diameter side of the other flange so that the first measuring point and the position of each flange in the peripheral direction may be the same; a first light receiver that receives the first parallel light that passes the first measuring point and the second parallel light that passes the second measuring point and obtains the position of the first measuring point and the position of the second measuring point based on the receiving position of the first parallel light and the second parallel light; a second light projector that irradiates a third parallel light that passes a third measuring point set up on the outer diameter side of the inner surface of one of the flanges and a fourth parallel light that passes a fourth measuring point set up on the outer diameter side of the inner surface of the other flange so that the third measuring point and the position of each flange in the peripheral direction may be the same; and a second light receiver that obtains the position of the third measuring point and the position of the fourth measuring point based on the receiving position of the third parallel light and the fourth parallel light.

With the constitution described above, while rotating the tape reel by the rotator, the first, second, third, and fourth parallel lights that pass the first, second, third and fourth measuring points are irradiated from the first and second light projector, the first, second, third, and fourth parallel lights that pass the first, second, third, and fourth measuring points are received by the first light receiver and the second light receiver, the positions of the first, second, third, and fourth measuring points are obtained based on the receiving position of the first, second, third, and fourth parallel lights, to thereby inspect the dimension accuracy of the position of each flange, the distance between flanges, and the inclined angles of each inner surfaces of the flanges on the inner diameter side or the outer diameter side of the flanges.

In an exemplary mode of the inspection method of this invention, by use of the inspection device of the tape reel, while rotating the tape reel by the rotator, the first, second, third, and fourth parallel lights are irradiated from the first light projector and the second light projector, the first, second, third, and fourth parallel lights that pass the first, second, third, and fourth measuring points are received by the first light receiver and the second light receiver, the positions of the first, second, third, and fourth measuring points are respectively obtained based on the receiving position of the first, second, third, and fourth parallel lights, the position of each flange and the distance between flanges are computed from the first measuring point and the second measuring point, the position of each flange on the outer diameter side and the distance between flanges are computed from the position of the third measuring point and the fourth measuring point, the inclined angle of the inner surface of one of the flanges is computed from the first measuring point and the third measuring point, the inclined angle of the inner surface of the other flange is computed from the second measuring point and the fourth measuring point, and the position of each flange on the inner diameter side of the flange, and the distance between flanges, the position of each flange on the outer diameter side of the flange, the inclined angle of the inner surface of one of the flanges and the inclined angle of the inner surface of the other flange, are compared with target values prepared beforehand. Thereby, the dimension accuracy of the position of each flange on the inner diameter side or the outer diameter side of the flanges of the tape reel, the distance between the flanges, and the inclined angle of the inner surface of each flange is inspected.

As described above, based on the first, second, third, and fourth parallel lights received by the first light receiver and the second light receiver, the positions of the first, second, third, and fourth measuring points are obtained, from the first measuring point and the second measuring point the position of each flange in the inner diameter side and the distance between flanges are computed, from the second measuring point and the fourth measuring point the position of each flange on the outer diameter side of the flanges and the distance between flanges are computed, from the first measuring point and the third measuring point, the inclined angle of the inner surface of one of the flanges is computed, from the second and fourth measuring points, the inclined angle of the inner surface of the other flange can be computed. And the computed position of each flange on the inner diameter side, distance between the flanges, and the computed position of each flange on the outer diameter side, distance between the flanges, the inclined angle of the inner surface of one of the flanges, and the inclined angle of the inner surface of the other flange are compared with the target value prepared beforehand, to thereby inspect the dimension accuracy of the position of each flange on the inner diameter side or the outer diameter side of the tape reel, the distance between flanges, and the inclined angle of the inner surface of each flange, respectively.

In addition, the "target value" in this invention may be one value, or may be the value having width ranging from the maximum to the minimum. For example, if the "target value" is one value, judging from whether the measured value is within a fixed range, for example, within±0.1 mm or not the position of the inner surface (measured value) obtained by the light receiver and the target value can be compared. Also, if the "target value" is the value having width, judging from whether the measured value is within the width or not the position of the inner surface (measured value) obtained by the light receiver and the target value can be compared.

A method for positioning of the position of the flanges accurately will be explained in a preferred embodiment hereafter. However, if this method is summarized, the positioning device of a member to be positioned comprises a table that places the member to be positioned, a guide pin erected on the placement surface of this table so as to be engaged with the positioning hole of a member to be positioned for positioning on the table, pluralities of injection pores opening on the outer periphery surface of the guide pin, an internal passage that injects fluid of a predetermined pressure from the injection pores toward the inner periphery surface of the positioning hole of the member to be positioned, a fluid supply device connected to the other end of the internal passage for supplying the fluid of predetermined pressure thereto, and according to the pressure of the fluid injected from each injection port, the member to be positioned is moved to an aligning position centering on the guide pin.

Incidentally, in this invention, "pluralities of injection pores opening on the outer periphery surface of the guide pin are formed so that the member to be positioned may be moved to the aligning position centering on the guide pin by the pressure of the fluid injected from each injection pore." means that the number of pluralities of openings, opening area, and the direction of the openings are determined so that the member to be positioned may be moved to the aligning position centering on the guide pin by the pressure of the pluralities of fluids injected from each injection pore. Also, in this invention, "a predetermined pressure" means the pressure of fluids capable of moving the member to be positioned to the guide pin in the axial direction, against the weight of the member to be positioned.

In another exemplary mode of the positioning device of a member to be positioned, the table is supported by an elastic body in an elevating/lowering manner, so that the gap partitioned by the inner periphery surface of the positioning hole, the outer periphery surface of the guide pin, and the placement surface of the table, may be closed by the lid.

With the above constitution, the table is lowered by the pressure of the fluid that acts on the whole gap. And the fluid partially purges from the gap between the table and the member to be positioned by lowering of the table, therefore, the pressure of the gap can be stabilized and the member to be positioned can be stabilized in the aligning position.

In another exemplary mode of the positioning device of a member to be positioned, the negative pressure suction pore opens on the placement surface of the table for the member to be positioned, so as to generate the absorbing negative pressure in the negative suction pore after positioning the member to be positioned, to thereby absorb the member to be positioned into the table.

With the above constitution, the member to be positioned can be fixed in a state of being positioned. Also, when positioning, by applying a positive pressure so that the member to be positioned may be slightly floated, aligning can also be made easy.

Furthermore, this invention can also be used for the positioning by knock pins and holes. By the engagement of the knock pins and the holes, a member of the knock pin side and a member of the hole side are mutually engaged, to thereby allow fitting socket-and-spigot parts to be fitted mutually by positioning. However, the processing accuracy of the knock pins and the holes affects the accuracy of the positioning directly. Therefore, the knock pins and the holes must be formed in high accuracy. If this invention is applied, the engagement of the knock pins and the holes can be loosened, and the processing accuracy is also reduced, to thereby achieve a cost cut.

In addition, this invention can also be used in a reel or an optical disc as positioning device for detecting the mutual inclination (eccentricity) by the hub and the flange, and uneven thickness by poor attachment.

BRIEF DESCRIPTION OF THE INVENTION

PREFERRED EMBODIMENT OF THE INVENTION

Figure 1:
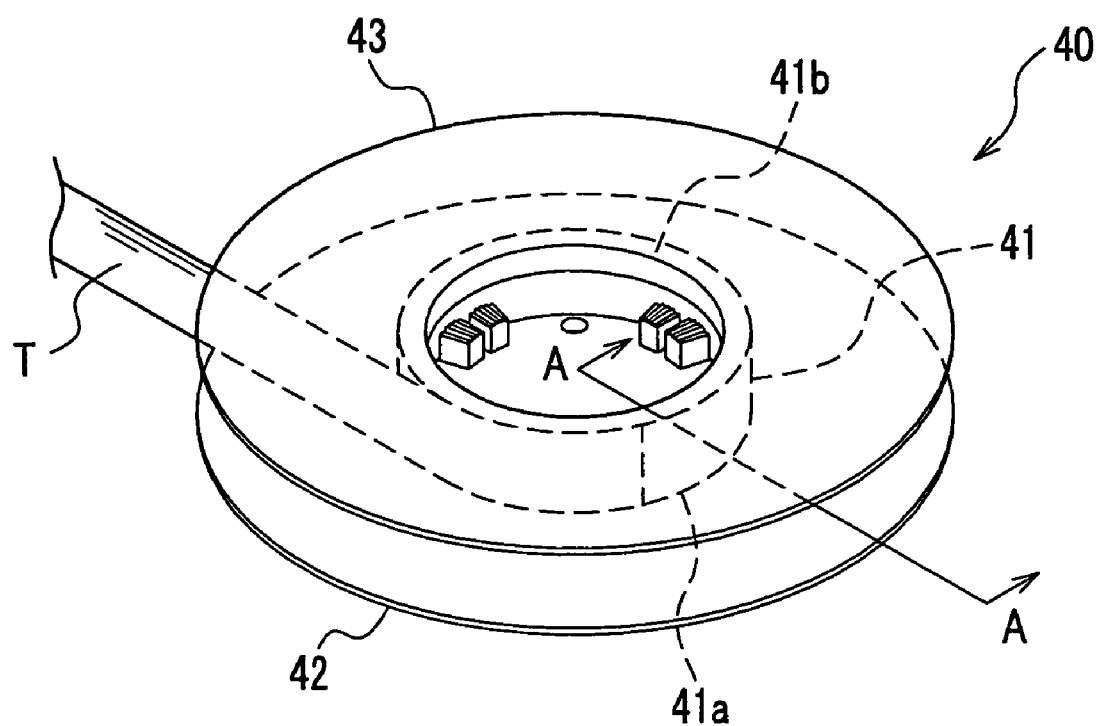
FIG. 1 is a perspective view showing an example of the tape reel.
Figure 2:
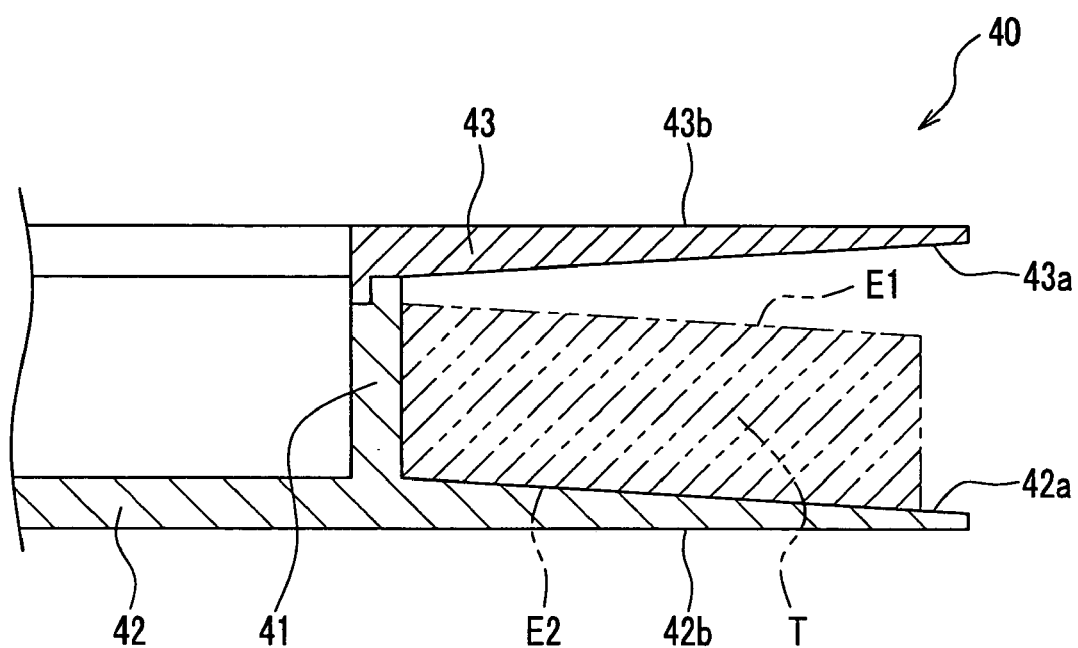
FIG. 2 is a sectional view taken along the line A—A in FIG. 1.
Figure 3:
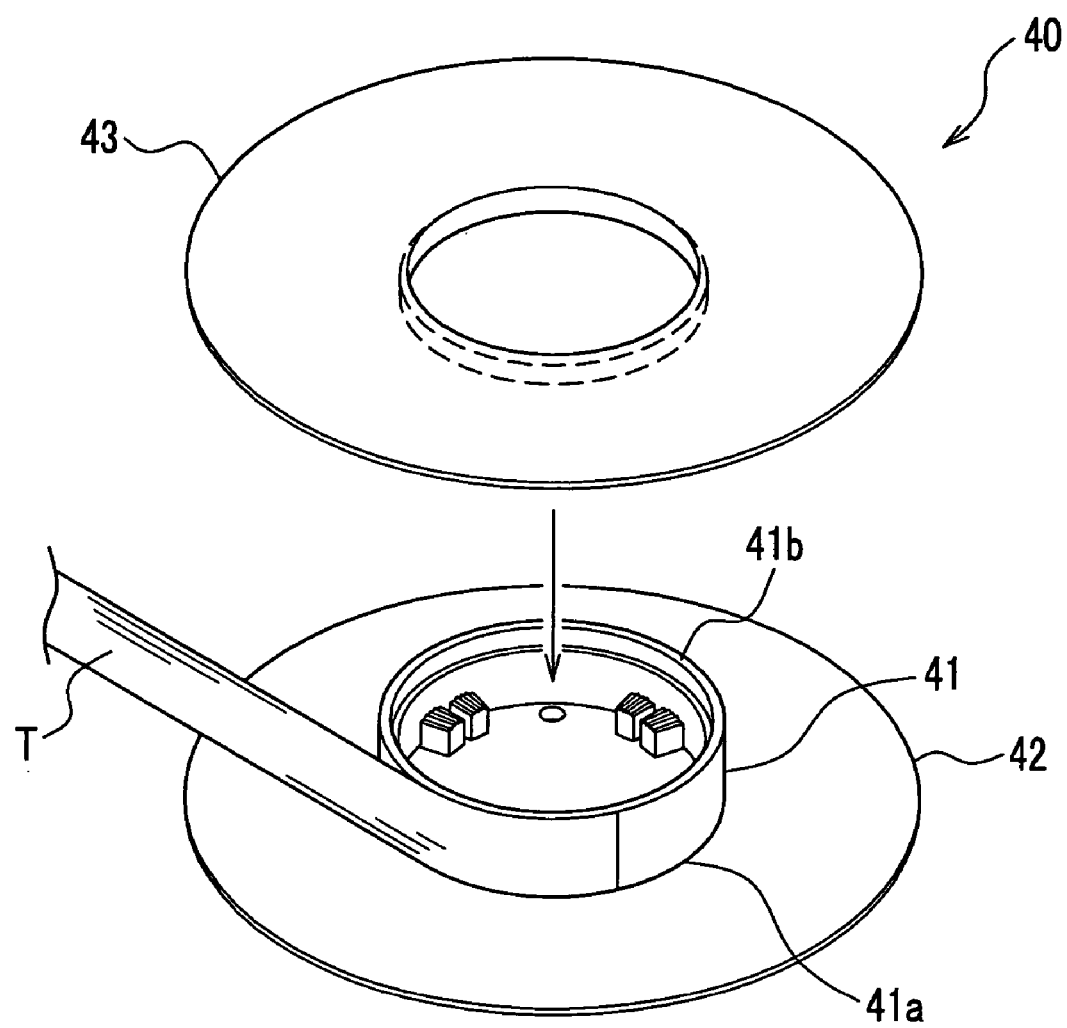
FIG. 3 is an exploded perspective view for explaining a method for manufacturing the tape reel of FIG. 1.

First, preferred embodiments of an inspection device of a tape reel according to this invention will be explained in conjunction with the drawings suitably. Incidentally, it is assumed here that the inspection device is arranged on a manufacturing process of the tape reel 40 (see FIG. 1 and FIG. 2), and a dimension accuracy of the positions of flanges 42, 43 of inner diameter side or outer diameter side of flanges 42, 43, distance between flanges 42 and 43, and inclined angles of inner surfaces 42a, 43a of the flanges 42, 43 are inspected.

Figure 4:
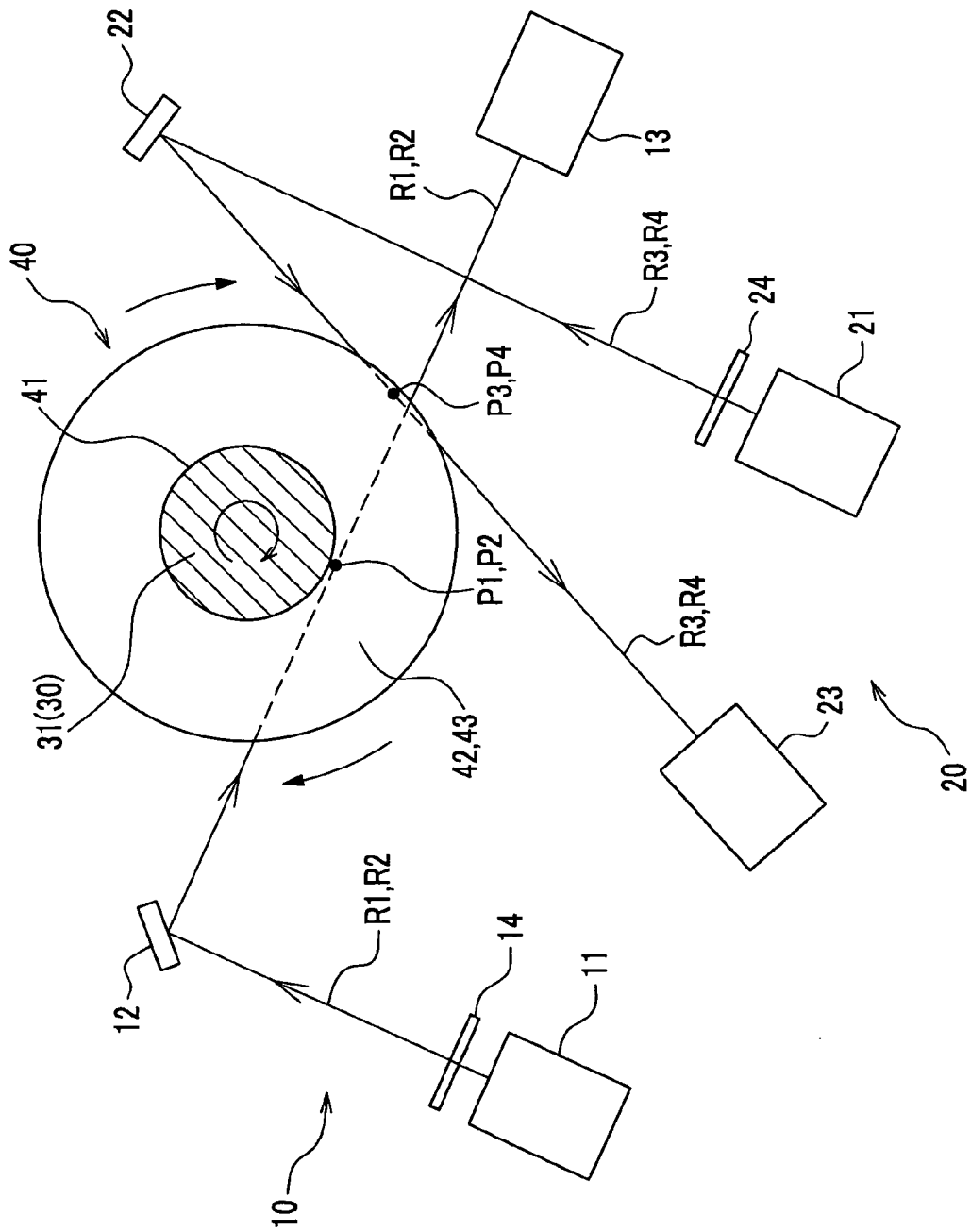
FIG. 4 is a plan view showing a constitution of an inspection device of the tape reel.
Figure 5A:
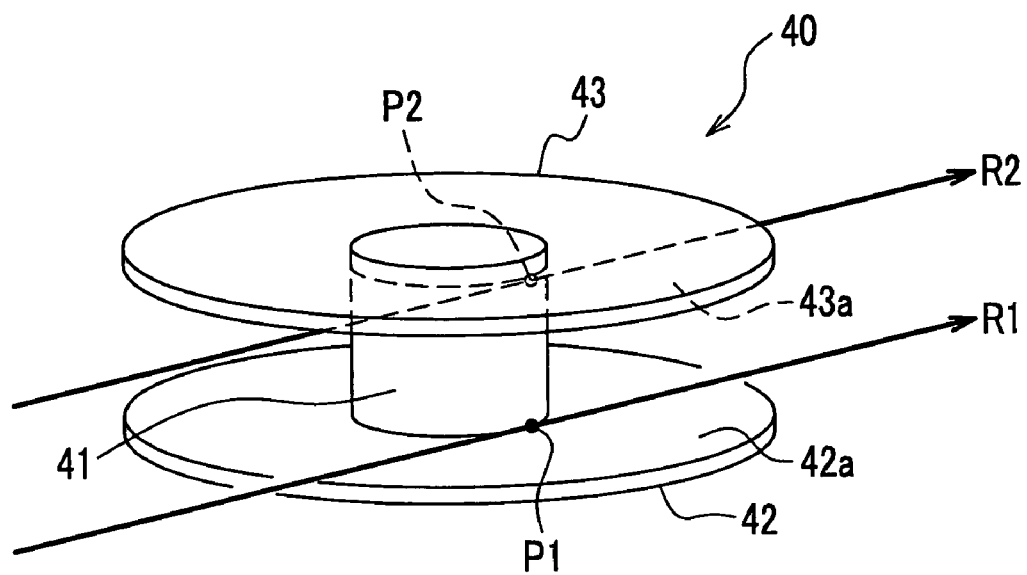
FIG. 5A is a view showing a state in which parallel lights R1, R2 are irradiated onto the inner surface of the lower flange and the upper flange.
Figure 5B:
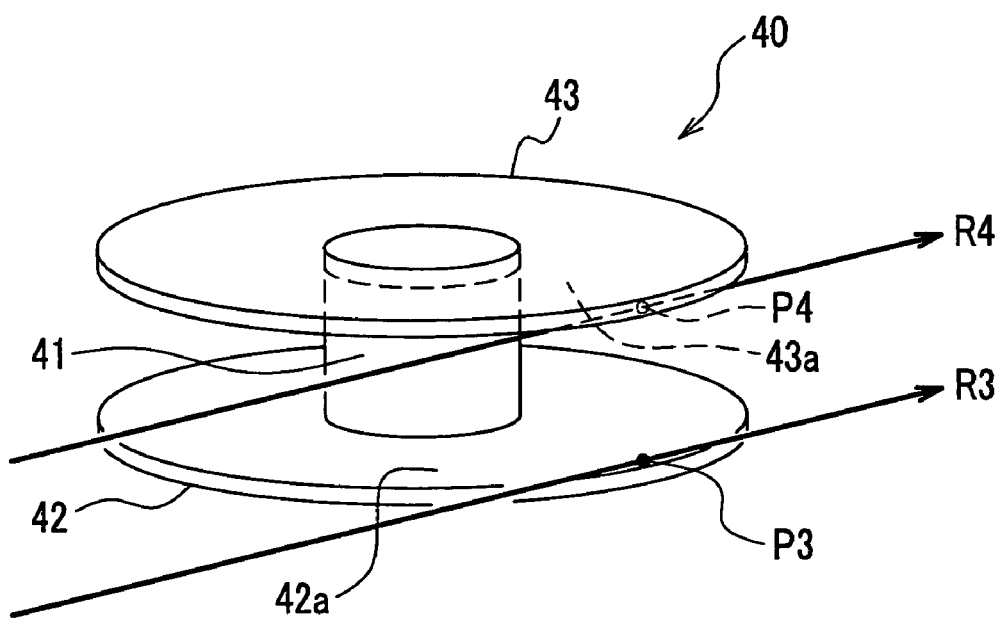
FIG. 5B is a view showing a state in which parallel lights R3, R4 are irradiated onto the inner surface of the lower flange and the upper flange.

Hereafter, a constitution of the inspection device of the tape reel will be explained referring to FIG. 4 and FIG. 5. FIG. 4 is a plan view showing a constitution of the inspection device of the tape reel of this invention. FIG. 5A is a view showing a state in which a parallel light R1 is irradiated onto the inner surface 42a of a lower flange 42 from a light projector 11, and FIG. 5B is a view showing a state in which a parallel light R4 is irradiated onto the inner surface 43a of an upper flange 43 from a light projector 21, respectively.

As shown in FIG. 4, the inspection device of the tape reel is constituted including a first inspection device 10 consisting of a light projector 11, a mirror 12 and a light receiver 13, and a second inspection device 20 consisting of a light projector 21, a mirror 22 and a light receiver 23, and a rotator 30 that rotates the tape reel 40.

The parallel lights R1, R2 irradiated from the light projector 11 are reflected by the mirror 12 to make incident on the inner surfaces 42a, 43a of the flanges 42, 43 (see FIG. 5A). Similarly, the parallel lights R3, R4 irradiated from the light projector 21 are reflected by the mirror 22 to make incident on the inner surfaces 42a, 43a of the flanges 42, 43. (see FIG. 5B). And the parallel lights R1 to R4 that pass the inner surfaces 42a, 43a of the flanges 42, 43 are received by the light receiver 13 or the light receiver 23. In addition, the light receiver 13 and the light receiver 23 are connected to a computer (not shown) for computing the positions of the flanges 42, 43, distance between flanges 42 and 43, and inclined angles of the inner surfaces 42a, 43a of the flanges 42, 43. Each part of the inspection device of the tape reel will be explained in detail hereafter.

The light projector 11 and the light projector 21 collect the light emitted from a light source by a lens so as to irradiate in one direction. The light projector 11, as shown in FIG. 5A, irradiates the parallel light R1 that pass the measuring point P1 set up on the inner diameter side of the inner surface 42a of the lower flange 42, and the parallel light R2 that passes the measuring point P2 set up on the inner diameter side of the inner surface 43a of the upper flange 43. Similarly, the light projector 21, as shown in FIG. 5B, irradiates the parallel light R3 that passes the measuring point P3 set up on the outer diameter side of the inner surface 42a of the lower flange 42, and the parallel light R4 that passes the measuring point P4 set up on the outer diameter side of the inner surface 43a of the upper flange 43.

Incidentally, as shown in FIG. 4, the position of the measuring point P1 and the position of the measuring point P2 are set up so as to be the same with the position (phase) of the flanges 42, 43 in the peripheral direction. Similarly, the positions of the measuring point P3 and the measuring point P4 are set up so as to be the same with the position (phase) of the flanges 42, 43 in the peripheral direction.

Figure 6A:
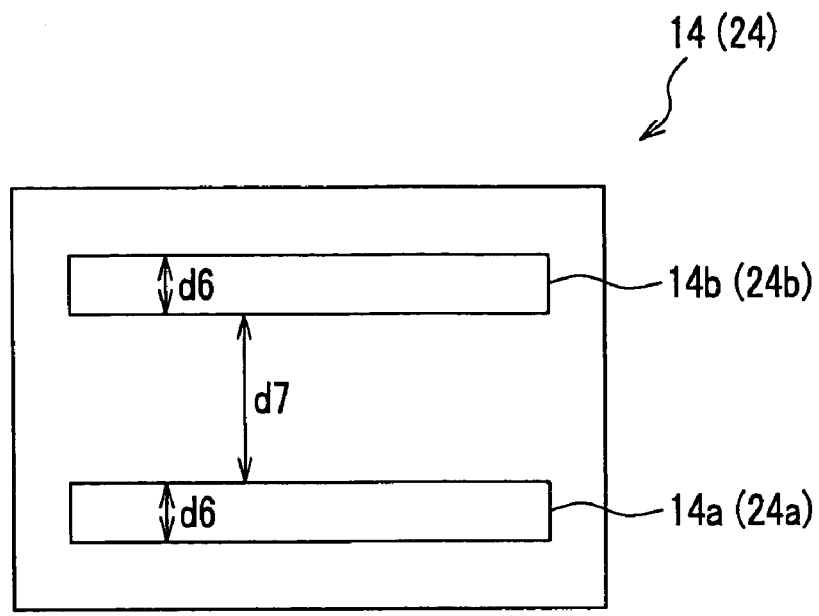
FIG. 6A is a front view showing a constitution of a shielding plate.
Figure 6B:
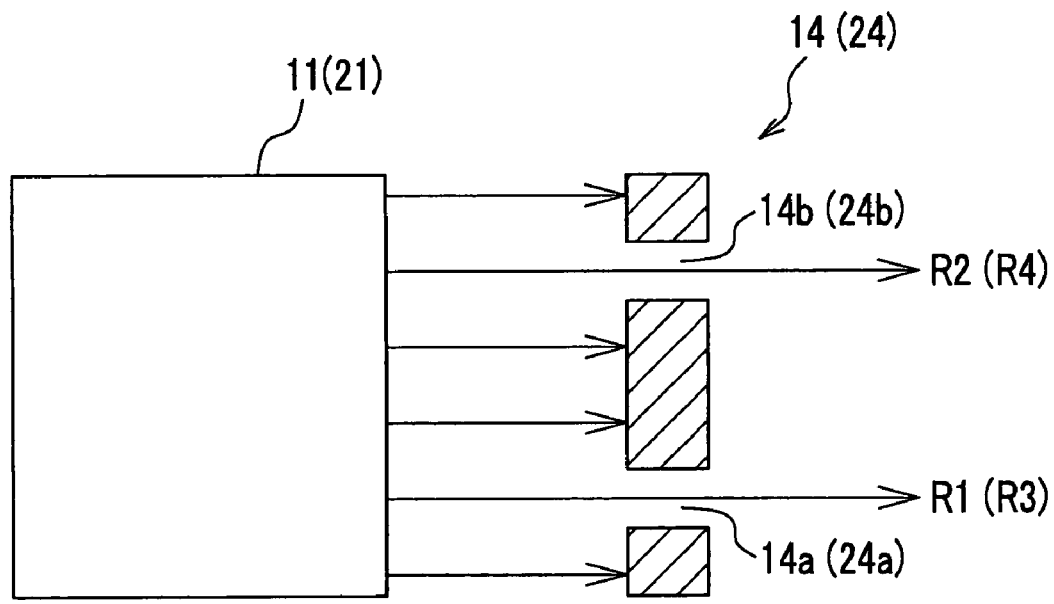
FIG. 6B is a side view showing a state in which only parallel light is irradiated in the vicinity of the inner surface of the flange of the tape reel, from the lights irradiated from a light projector using a shielding plate shown in FIG. 6A.

Also, as shown in FIG. 4, shielding plates 14, 24 for generating the parallel lights R1 to R4 from the light irradiated from the light projector 11 or the light projector 21 are set up respectively. FIG. 6A is a front view showing a constitution of the shielding plate 24 set up on the light projecting face side of the shielding plate 14 and the shielding plate 21 set up on the light projecting face side of the light projector 11. In addition, FIG. 6A is a side view showing a state in which only parallel lights R1 to R4 irradiated in the vicinity of the inner surfaces 42a, 43a of the flanges 42, 43 of the tape reel 40 pass.

As shown in FIG. 6A, in a lower portion of the shielding plate 14 (24), a slit 14a(24a) is formed, and the slit 14a(24a) allows only the parallel light R1 (R3) irradiated in the vicinity of the inner surface 42a of the lower flange 42 of the tape reel 40 to pass, removing a non-parallel light from the light irradiated from the light projector 11 or the light projector 21. That is, the slit 14a (24a) functions so as to generate the parallel light R1 (R3) made incident along the inner surface 42a of the lower flange 42.

Similarly, as shown in FIG. 6A, slit 14b (24b) is formed in a upper portion of the shielding plate 14 (24), and the slit 14b (24b) allows only parallel light R2 (R4) irradiated in the vicinity of the inner surface 43a of the upper flange 43 of the tape reel 40 to pass, removing a non-parallel light from the light irradiated from the light projector 11 or the light projector 21. That is, the slit 14b (24b) functions so as to generate the parallel light R2 (R4) made incident along the inner surface 43a of the lower flange 43.

Incidentally, slit width d6 of the slit 14a (24a) and the slit 14b (24b) is determined suitably in agreement with a form of the inner surfaces 42a, 43a of the flanges 42, 43. In addition, interval d7 of the slit 14a (24a) and the slit 14b (24b) is determined suitably in agreement with the distance between the flanges 42 and 43.

As described above, by forming a shielding plate 14 on the light projecting face side of the light projector 11, the parallel light R1 that passes the slit 14a can be made incident on the measuring point P1 set up on the inner diameter side of the inner surface 42a of the lower flange 42 along the inner surface 42a (see FIG. 5A). In addition, the parallel light R2 that passes the slit 14b can be made incident on the measuring point P2 set up on the inner diameter side of the inner surface 43a of the upper flange 43 along the inner surface 43a (see FIG. 5A).

Accordingly, non-parallel lights hardly make incident on the measuring points P1, P2 of the inner surfaces 42a, 43a of the flanges 42, 43. Therefore, when receiving inspection lights (parallel lights R1, R2) that pass the measuring points P1, P2 by the light receivers 13, 23, edges of the inner surfaces 42a, 43a of the flanges 42, 43 can be clearly recognized. In addition, the lights made incident on the inner surfaces 42a, 43a of the flanges 42, 43 are not reflected by the inner surfaces 42a, 43a. Further, for example, even if the upper flange 43 is fabricated from a transparent material, the lights made incident on the inner surface 43a of the upper flange 43 don't penetrate the upper flange 43.

Similarly, by forming the shielding plate 24 on the light projecting face side of the light projector 21, the parallel light R3 that passes the slit 24a can be made incident on the measuring point P3 set up on the outer diameter side of the inner surface 42a of the lower flange 42, in parallel to the inner surface 42a (see FIG. 5B). Moreover, the parallel light R4 that passes the slit 24b can be made incident on the measuring point P4 set up on the outer diameter side of the inner surface 43a of the upper flange 43 in parallel to the inner surface 43a. (see FIG. 5B).

Accordingly, non-parallel lights hardly make incident on the measuring points P3, P4 of the inner surfaces 42a, 43a of the flanges 42, 43. Therefore, when receiving inspection lights (parallel lights R3, R4) that pass the measuring points P3, P4 by the light receivers 13, 23, edges of the inner surfaces 42a, 43a of the flanges 42, 43 can be clearly recognized. In addition, the lights made incident on the inner surfaces 42a, 43a of the flanges 42, 43 are not reflected by the inner surfaces 42a, 43a of the flanges 42, 43. Further, for example, even if the upper flange 43 is fabricated from a transparent material, the lights made incident on the inner surface 43a of the upper flange 43 don't penetrate the upper flange 43.

Mirror 12 and mirror 22 function so as to reflect the parallel lights R1 to R4 irradiated from the light projector 11 or the light projector 21, so that the parallel lights R1 to R4 may be made incident on the inner surfaces 42a, 43a of the flanges 42, 43 of the tape reel 40. Specifically, as shown in FIG. 4, the mirror 12 is formed in the light projecting direction of the light projector 11, and reflects the parallel lights R1, R2 irradiated from the light projector 11 toward the tape reel 40, so that the parallel lights R1, R2 may be made incident on the inner surfaces 42a, 43a of the flanges 42, 43 of the tape reel 40. In addition, the mirror 22 is formed in the light projecting direction of the light projector 21, and function so as to reflect the parallel lights R3, R4 irradiated from the light projector 21 toward the tape reel 40, so that the parallel lights R3, R4 may be made incident on the inner surfaces 42a, 43a of the flanges 42, 43.

As described above, by forming in such a way that the parallel lights R1 to R4 irradiated from the light projector 11 or the light projector 21 are reflected by the mirror 12 or the mirror 22, to thereby make incident on the inner surfaces 42a, 43a of the flanges 42, 43 of the tape reel 40, position relation between the light projector 11 and the light receiver 13 in the first inspection device 10, and position relation between the light projector 21 and the light receiver 23 in the second inspection device can be freely set up. Therefore, as shown in FIG. 4, the light projector 11 and the light receiver 13 in the first inspection device 10, and the light projector 21 and the light receiver 23 in the second inspection device 20 can be arranged in one side of the tape reel 40. Accordingly, a constitution of the inspection device can be simplified, to thereby make it possible to arrange the inspection device of the tape reel on the manufacturing process of the tape reel 40. Also, miniaturization of the inspection device of the tape reel is also achieved.

The light receiver 13 and the light receiver 23 function so as to receive the parallel lights R1 to R4 that pass each measuring point P1 to P4 of the inner surfaces 42a, 43a of the flanges 42, 43, followed by measuring the positions of each measuring point P1 to P4. In this embodiment, a CCD camera is used for the light receiver 13 and the light receiver 23. That is, in this invention, the parallel lights R1 to R4 that pass each measuring point P1 to P4 are photoed by the CCD camera for measuring the positions of each measuring point P1 to P4. Specifically, the position of each measuring point P1 to P4 is shown as the level and perpendicular coordinates in an image (FIG. 7A, FIG. 7B).

Figure 7A:
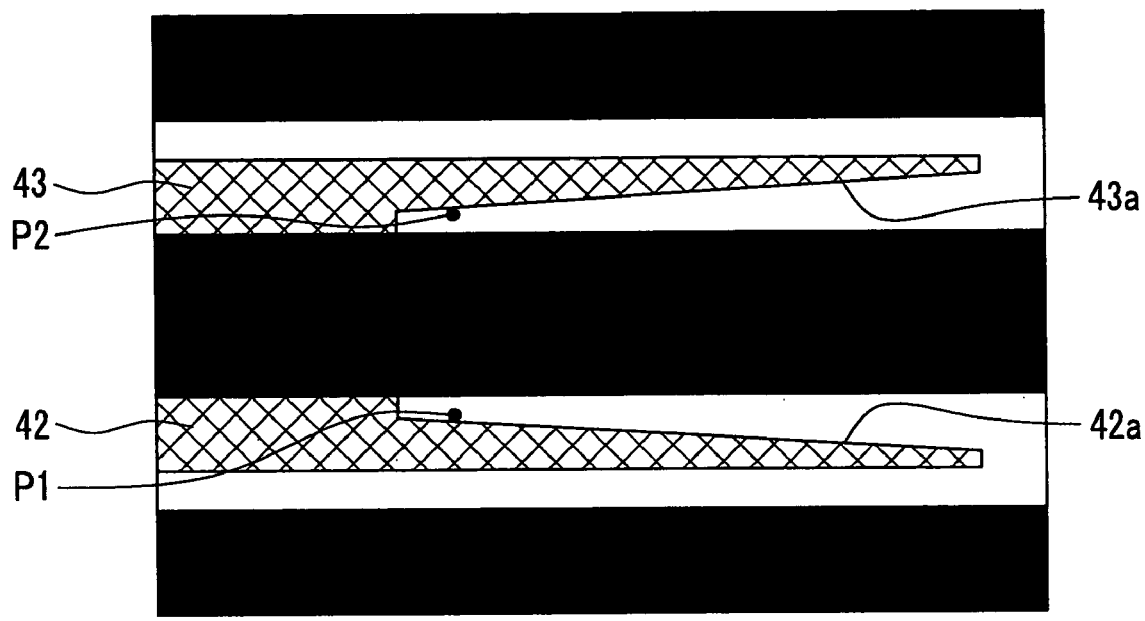
FIG. 7A is an image of the parallel lights R1, R2 that pass the measuring points P1, P2.
Figure 7B:
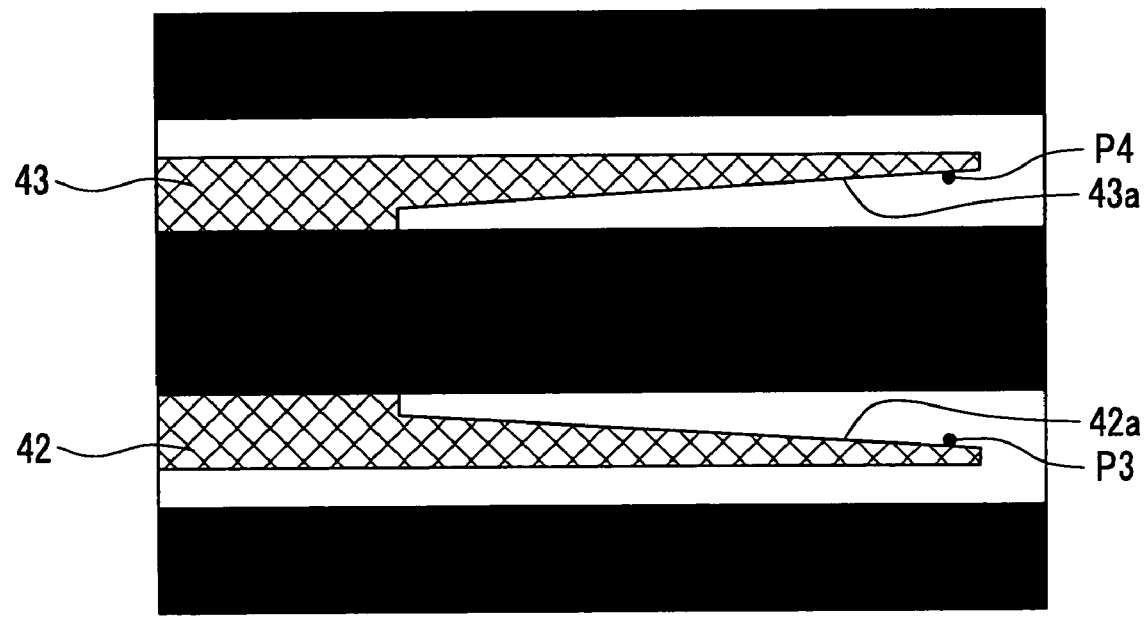
FIG. 7B is an image of the parallel lights R3, R4 that pass the measuring points P3, P4 photoed by the CCD camera.

FIG. 7A is an image of the parallel lights R1, R2 that pass the measuring points P1, P2, photoed by the light receiver (CCD camera) 13, and FIG. 7B is an image of the parallel lights R3, R4 that pass each measuring point P3, P4, photoed by the light receiver 23 (CCD camera).

As shown in FIG. 7A, and FIG. 7B, only in the vicinity of the inner surface 42a of the lower flange 42, and only in the vicinity of the inner surface 43a of the upper flange 43 are photoed by the light receivers (CCD camera) 13, 23. The reason is that as shown in FIG. 4, on the light projecting face side of the light projector 11 and the light projector 21, the shielding plates 14, 24 that allow only parallel lights R1 to R4 irradiated in the vicinity of the inner surface 42a of the lower flange 42 and in the vicinity of the inner surface 43a of the upper flange 43 to pass.

And the image photoed by the light receivers (CCD camera) 13, 23 (FIG. 7A, FIG. 7B) are inputted in a computer, which is not shown. In this computer, based on the position of each measuring point P1 to P4 of the inputted image (FIG. 7A, FIG. 7B), the distance between flanges 42 and 43 on the inner diameter side and the outer diameter side of the flanges 42 and 43 is obtained by calculation. In addition, based on the position of each measuring point P1 to P4, the inclined angles of the inner surfaces 42a, 43a of the flanges 42, 43 are obtained by calculation.

First, a method for obtaining the distance between flanges 42 and 43 on the inner diameter side and the outer diameter side of the flanges 42 and 43 by calculation will be explained referring to FIG. 8. FIG. 8 is a view for explaining the method for obtaining the distance between flanges 42 and 43 on the inner diameter side and the outer diameter side of the flanges 42 and 43 based on the position of each measuring point P1 to P4, FIG. 8A is a view showing the method for obtaining distance D1 between flanges 42 and 43 on the inner diameter side of the flanges 42 and 43 based on the position of the measuring points P1, P2, and FIG. 8B is a view showing the method for obtaining distance D2 between flanges 42 and 43 on the outer diameter side of the flanges 42 and 43 based on the position of the measuring points P3, P4.

Figure 8A:
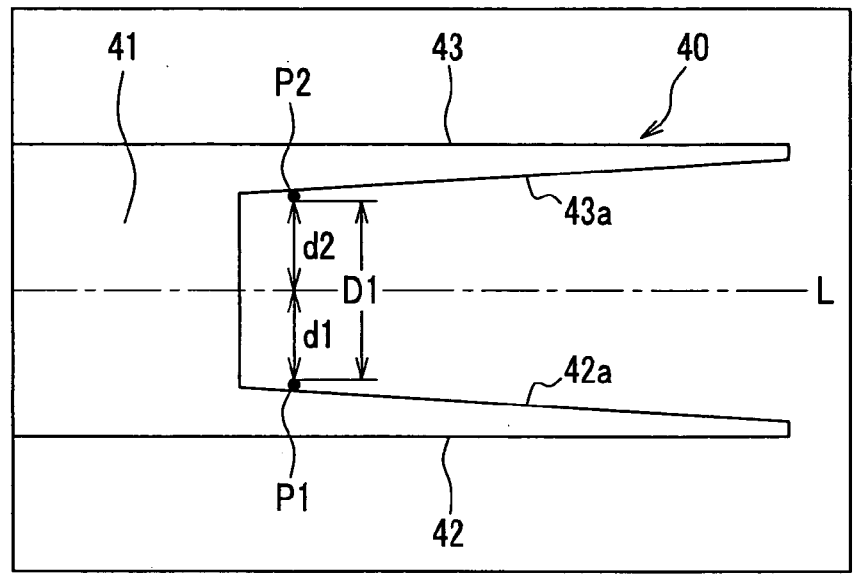
FIG. 8A is a view showing a method for obtaining the distance between flanges of the inner diameter side of the flanges based on the position of the measuring points P1, P2.

As shown in FIG. 8A, when obtaining the distance D1 between flanges 42 and 43 on the inner diameter side of the flanges 42 and 43 based on the measuring points P1, P2 in the computer, first, distance from base line L set up in the center of the lower flange 42 and the upper flange 43, to the measuring point P1 is set as d1, and distance from the base line L to the measuring point P2 is set as d2. Next, The distance d1 from the base line L to the measuring point P1 and the distance d2 from the base line L to the measuring point P2 are totaled. The value which totaled this distance d1 and distance d2 becomes the distance D1 between the flanges 42 and 43 on the inner diameter side of the flanges 42 and 43.

Figure 8B:
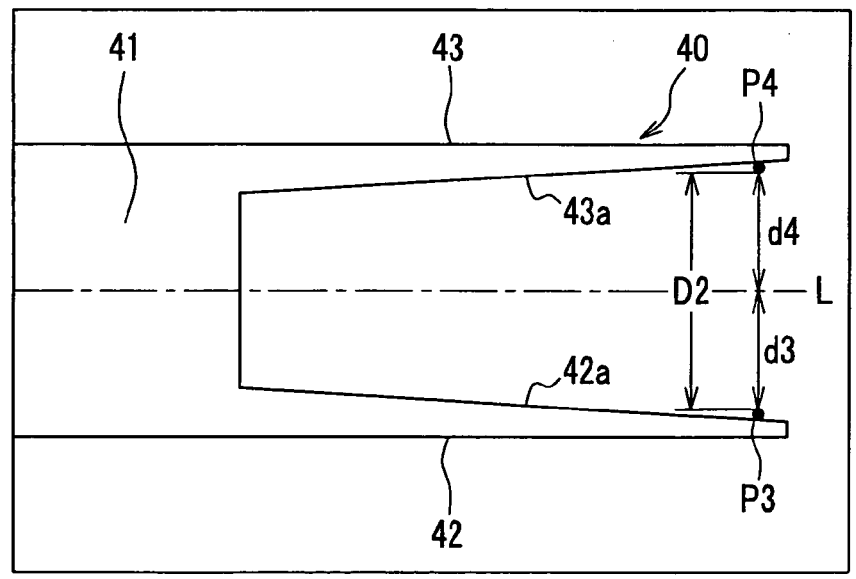
FIG. 8B is a view showing a method for obtaining the distance between flanges of the outer diameter side of the flanges based on the position of the measuring points P3, P4.

Similarly, as shown in FIG. 8B, when obtaining the distance D1 between flanges 42 and 43 on the outer diameter side of the flanges 42 and 43 based on the measuring points P3, P4 in the computer, first, distance from base line L set up in the center of the lower flange 42 and the upper flange 43, to the measuring point P3 is set as d3, and distance from the base line L to the measuring point P4 is set as d4. Next, The distance d3 from the base line L to the measuring point P3 and the distance d4 from the base line L to the measuring point P4 are totaled. The value which totaled this distance d3 and distance d4 becomes the distance D2 between the flanges 42 and 43 on the outer diameter side of the flanges 42 and 43.

And the positions of each measuring point P1 to P4 measured by the light receiver 13 and 23 are compared with a target value of each measuring point P1 to P4 of the flanges 42 and 43 stored in the computer beforehand, to thereby inspect the dimension accuracy of the positions of each measuring point P1 to P4 of the flanges 42 and 43.

In addition, the distance D1 between the flanges 42 and 43 on the inner diameter side of the flanges 42 and 43 are compared with a target value of the distance between the flanges 42 and 43 on the inner diameter side of the flanges 42 and 43 stored in the computer beforehand, to thereby inspect the distance D1 between the flanges 42 and 43 on the inner diameter side of the flanges 42 and 43.

Similarly, the distance D2 between the flanges 42 and 43 on the outer diameter side of the flanges 42 and 43 are compared with a target value of the distance between the flanges 42 and 43 on the outer diameter side of the flanges 42 and 43 stored in the computer beforehand, to thereby inspect the distance D2 between the flanges 42 and 43 on the outer diameter side of the flanges 42 and 43.

Figure 9A:
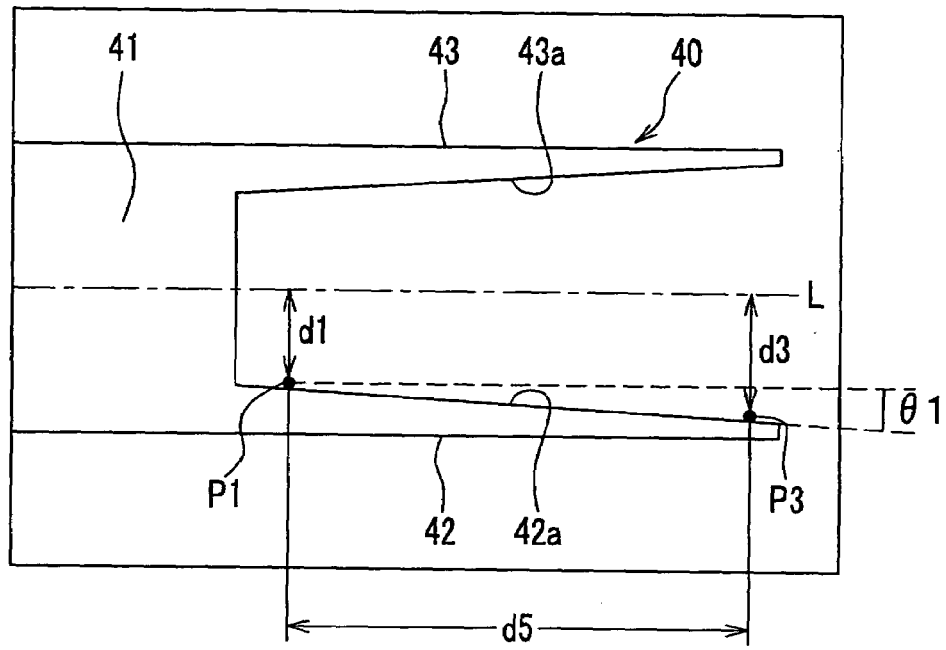
FIG. 9A is a view showing a method for obtaining the inclined angle of the inner surface of a lower flange based on the position of the measuring points P1, P3.
Figure 9B:
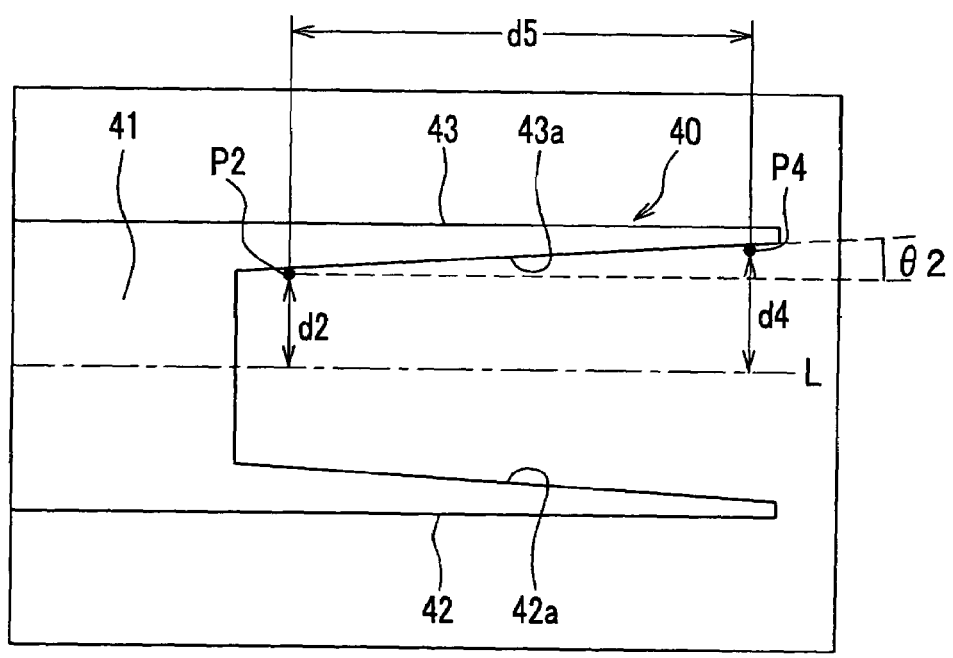
FIG. 9B is a view showing a method for obtaining the inclined angle of the inner surface of an upper flange based on the position of the measuring points P2, P4.

Next, a method for obtaining the inclined angles of the inner surfaces 42a, 43a of the flanges 42, 43 based on the position of each measuring point P1 to P4 by computation will be explained referring to FIG. 9. FIG. 9 is a view for explaining a method for obtaining the inclined angles of the inner surfaces 42a, 43a of the flanges 42, 43 based on the position of each measuring point P1 to P4, FIG. 9A is a view showing a method for obtaining the inclined angle of the inner surface 42a of the lower flange 42 based on the position of the measuring points P1 and P3, FIG. 9B is a view showing a method for obtaining the inclined angle of the inner surface 43a of the upper flange 43 based on the position of the measuring points P2, P4. Also, FIG. 10 is a plan view for explaining a phase difference between the measuring points P1, P2 and the measuring points P3, P4 based on the position of the measuring points P2, P4.

As shown in FIG. 9A, when obtaining the inclined angle of the inner surface 42a of the lower flange 42 by calculation based on the position of each measuring point P1, P3 in the computer, distance d5 between the measuring point P1 and the measuring point P3 is obtained first. Next, difference between distance d1 from the base line L to the measuring point P1 and distance d3 from the base line L to the measuring point P3 is divided by distance d5 between the measuring points P1 and P3. The value obtained by dividing the difference of distance d1 and distance d3 by distance d5 becomes inclined angle θ1 of the inner surface 42a of the lower flange 42.

Similarly, as shown in FIG. 9B, when obtaining the inclined angle of the inner surface 43a of the lower flange 43 by calculation based on the position of each measuring point P2, P4 in the computer, distance d5 between the measuring point P2 and the measuring point P4 is obtained, first. Next, difference between distance d2 from the base line L to the measuring point P2 and distance d4 from the base line L to the measuring point P4 is divided by distance d5 between the measuring points P2 and P4. The value obtained by dividing the difference betweem distance d2 and distance d4 by distance d5 becomes inclined angle θ2 of the inner surface 43a of the lower flange 43.

Figure 10:
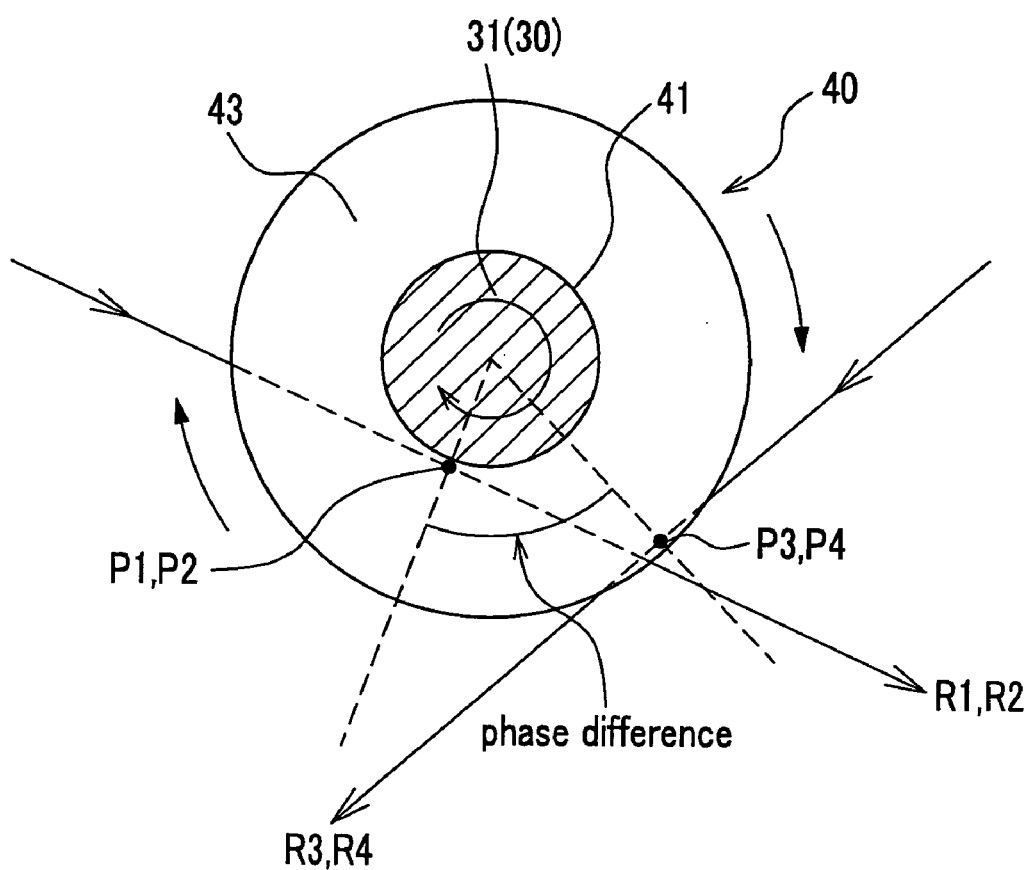
FIG. 10 is a plan view for explaining a phase difference between measuring points P1, P2 and measuring points P3, P4.

Incidentally, as shown in FIG. 10, there is a difference in position (phase), that is, phase difference in the peripheral direction of the tape reel 40 between the measuring points P1, P2 measured by the light receiver 13 of the first inspection device 10, and the measuring points P3, P4 measured by the light receiver 23 of the second inspection device 20. Therefore, in the computer, when obtaining the inclined angle of the inner surface 42a of the lower flange 42, it is adjusted so that the phase of the measuring points P1 and P3 may become the same. Similarly, when obtaining the inclined angle of the inner surface 43a of the upper flange, it is adjusted so that the phase of the measuring points P2 and P4 may become the same.

Specifically, the position of each measuring point P1 to P4 measured by the light receivers 13 and 23, and the phase of each measuring point P1 to P4 at this time are stored in the computer. And when obtaining the inclined angles θ1, θ2 of the inner surfaces of the flanges 42, 43, the phase of the measuring point P1 and the measuring point P3, and the phase of the measuring point P2 and the measuring point P4 are respectively matched.

And by comparing the inclined angle θ1 of the inner surface 42a of the lower flange 42 with object value of the inclined angle of the inner surface 42a of the lower flange 42 stored beforehand in the computer, the dimension accuracy of the inclined angle θ1 of the inner surface 42a of the lower flange 42 is inspected.

A rotator 30 functions so as to rotate the tape reel 40 when inspecting the tape reel 40. As shown in FIG. 4, the rotator 30 includes a cylindrical support part 31, which is inserted in the hub 41 of the tape reel 40, and supports the tape reel 40 so as to be freely rotatable. And when inspecting the tape reel 40, by rotating the support part 31, the tape reel 40 is rotated in the peripheral direction of the lower flange 42 and the upper flange 43 centering on the hub 41.

In addition, when an error possibly arises in the inspection result of the tape reel 40 due to vibration transmitted to the tape reel 40 from the rotator 30, data of the vibration transmitted to the tape reel 40 from the rotator 30 is stored in the computer beforehand. Then, after inspecting the tape reel 40, the accuracy of inspection can be raised by comparing and adjusting the inspection result and the data of the vibration.

Next, an operation of the inspection device of the tape reel thus constituted will be explained mainly referring to FIG. 4 and FIG. 5. Incidentally, the inspection device shown in FIG. 4, is operated by being controlled by a control device which is not shown.

First, as shown in FIG. 4, the parallel lights R1, R2 are irradiated toward the mirror 12 from the light projector 11 while rotating the tape reel 40 by the rotator 30. Similarly, the parallel lights R3, R4 are irradiated toward the mirror 22 from the light projector 21.

The parallel lights R1, R2 irradiated toward the mirror 12 are reflected by the mirror 12 (see FIG. 4), to be made incident on the inner surfaces 42a, 43a of the flanges 42, 43 (see FIG. 5A). The parallel light R1 made incident along the inner surfaces 42a, 43a of the flanges 42, 43 passes the measuring point P1 set up on the inner diameter side of the inner surface 42a of the lower flange 42, and the parallel light R2 passes the measuring point P2 set up on the inner diameter side of the inner surface 43a of the upper flange 43.

Similarly, the parallel lights R3, R4 irradiated toward the mirror 22 are reflected by the mirror 22 (see FIG. 4), to be made incident along the inner surfaces 42a, 43a of the flanges 42, 43 of the tape reel 40 (see FIG. 5B). The parallel light R3 made incident along the inner surfaces 42a, 43a of the flanges 42, 43 passes the measuring point P3 set up on the outer diameter side of the inner surface 42a of the lower flange 42, and the parallel light R4 passes the measuring point P4 set up on the outer diameter side of the inner surface 43a of the upper flange 43.

And the parallel light R1 that passes the measuring point P1 of the inner surface 42a of the lower flange 42 and the parallel light R2 that passes the measuring point P2 of the inner surface 43a of the upper flange 43 are received by the light receiver 13 (see FIG. 4). In the light receiver 13, the position of the measuring points P1, P2 are respectively obtained from the position of the received parallel lights R1, R2. In this embodiment, a CCD camera is used for the light receiver 13, therefore the positions of the measuring points P1, P2 are obtained from the image (see FIG. 7A) photoed by the CCD camera. The image (FIG. 7A) photoed by the light receiver 13 (CCD camera) is inputted in the computer.

Similarly, the parallel light R3 that passes the measuring point P3 of the inner surface 42a of the lower flange 42 and the parallel light R4 that passes the measuring point P4 of the inner surface 43a of the upper flange 43 are received by the light receiver 23 (see FIG. 4). In the light receiver 23, the position of the measuring points P3, P4 are respectively obtained from the position of the received parallel lights R3, R4. In this embodiment, a CCD camera is used for the light receiver 13, therefore the positions of the measuring points P3, P4 are obtained from the image (see FIG. 7A) photoed by the CCD camera. The image (FIG. 7A) photoed by the light receiver 23 (CCD camera) is inputted in the computer.

In the computer, distance D1 between the flanges 42, 43 on the inner diameter side of the flanges 42, 43 is obtained by calculation based on the positions of the measuring points P1, P2 of the image (FIG. 7A) photoed by the light receiver (CCD camera) 13 (see FIG. 8A). Similarly, distance D2 between the flanges 42, 43 on the outer diameter side of the flanges 42, 43 is obtained by calculation based on the positions of the measuring points P3, P4 of the image (FIG. 7B) photoed by the light receiver (CCD camera) 23 (see FIG. 8B).

Moreover, in the computer, the inclined angle θ1 of the inner surface 42a of the lower flange 42 is obtained by calculation based on the positions of the measuring points P1, P3 of the image (FIG. 7A, FIG. 7B) photoed by the light receivers (CCD camera) 13, 23 (see FIG. 9A). Similarly, the inclined angle θ2 of the inner surface 43a of the upper flange 43 is obtained by calculation based on the positions of the measuring points P2, P4 of the image (FIG. 7A, FIG. 7B) photoed by the light receivers (CCD camera) 13, 23 (see FIG. 9B).

And in the computer, by comparing the positions of each measuring points P1 to P4 measured by the light receivers 13, 23 with the target value of each measuring point P1 to P4 of the flanges 42, 43 stored beforehand in the computer, the dimension accuracy of the position of each measuring point P1 to P4 of the flanges 42, 43 is inspected.

Also, in the computer, by comparing distance D1 between flange 42 and 43 on the inner diameter side of the flanges 42 and 43 with the target value of the distance between flanges 42 and 43 on the inner diameter side of the flanges 42 and 43 stored beforehand in the computer, the dimension accuracy of the distance D1 between the flanges 42 and 43 on the inner diameter side of the flanges 42 and 43 is inspected.

Similarly, in the computer, by comparing distance D2 between the flange 42 and 43 on the inner diameter side of the flanges 42 and 43 with the target value of the distance between flanges 42 and 43 on the outer diameter side of the flanges 42 and 43 stored beforehand in the computer, the dimension accuracy of the distance D2 between flanges 42 and 43 on the outer diameter side of the flanges 42 and 43 is inspcected.

Further, in the computer, by comparing the position of each measuring point P1 to P4 measured by the light receivers 13, 23 with the target value of each measuring point P1 to P4 of the flanges 42, 43 stored beforehand in the computer, the position of P1 to P4 of each measuring point of the flanges 42, 43 is inspected.

Incidentally, here, the inspection device of the tape reel is constituted including a first inspection device 10 consisting of light the projector 11, the mirror 12 and the light receiver 13, and a second inspection device 20 consisting of the light projector 21, the mirror 22, and the light receiver 23. However, the number of the inspection device consisting of the light projector, the mirror and the light receiver is suitably determined as needed. As one example, when only measuring points P3, P4 set up on the outer diameter side of the inner surfaces 42a, 43a of the flanges 42, 43 of the tape reel 40 are required to be measured, only one inspection device consisting of the light projector, the mirror and the light receiver may be sufficed.

Also, here, the light projectors 11, 21 are formed of one light projector, however, the light projector 11, 21 may be formed of pluralities of light projectors also. In addition, the shielding plates 14, 24 generate the parallel lights R1 to R4 that make incident along the inner surfaces of the flanges, by slit 14a (24a), 14b, (24b). However, a pinhole may be substituted with the slit in order to generate the parallel lights R1 to R4.

In addition, here, the parallel lights R1 to R4 irradiated from the light projector 11 or the light projector 21 are reflected by the mirror 12 or the mirror 22, to be made incident on the inner surfaces 42a, 43a of the flanges 42, 43 of the tape reel 40. However, without using the mirror 12 or the mirror 22, the parallel lights R1 to R4 irradiated from the light projector 11 or the light projector 21 may be made incident on the inner surfaces 42a, 43a of the flanges 42, 43 of the tape reel 40 directly. Also, the CCD camera is used for the light receivers 13, 23, however, the CCD camera can be substituted with a photo sensor or the like.

Moreover, here, it is assumed that the dimension accuracy of the positions of the flanges 42, 43 on the inner diameter side or outer diameter side of the flanges 42, 43 of the tape reel 40, the distance between flanges 42 and 43, and the inclined angles of the inner surfaces 42a, 43a of the flanges 42, 43 is inspected. However, for example, the dimension accuracy of the outer peripheral surface (see FIG. 1) of the hub 41 of the tape reel 40 may also be inspected.

Next, preferred embodiment of "a positioning device of a member to be positioned" according to this invention will be explained in conjunction with the drawings suitably. The "positioning device of a member to be positioned" can be used when positioning the tape reel 40 in the rotator 30 of the "inspection device of a tape reel". Hereafter, the "a positioning device of a member to be positioned" will be explained in detail referring to FIG. 11 to FIG. 16.

Figure 11:
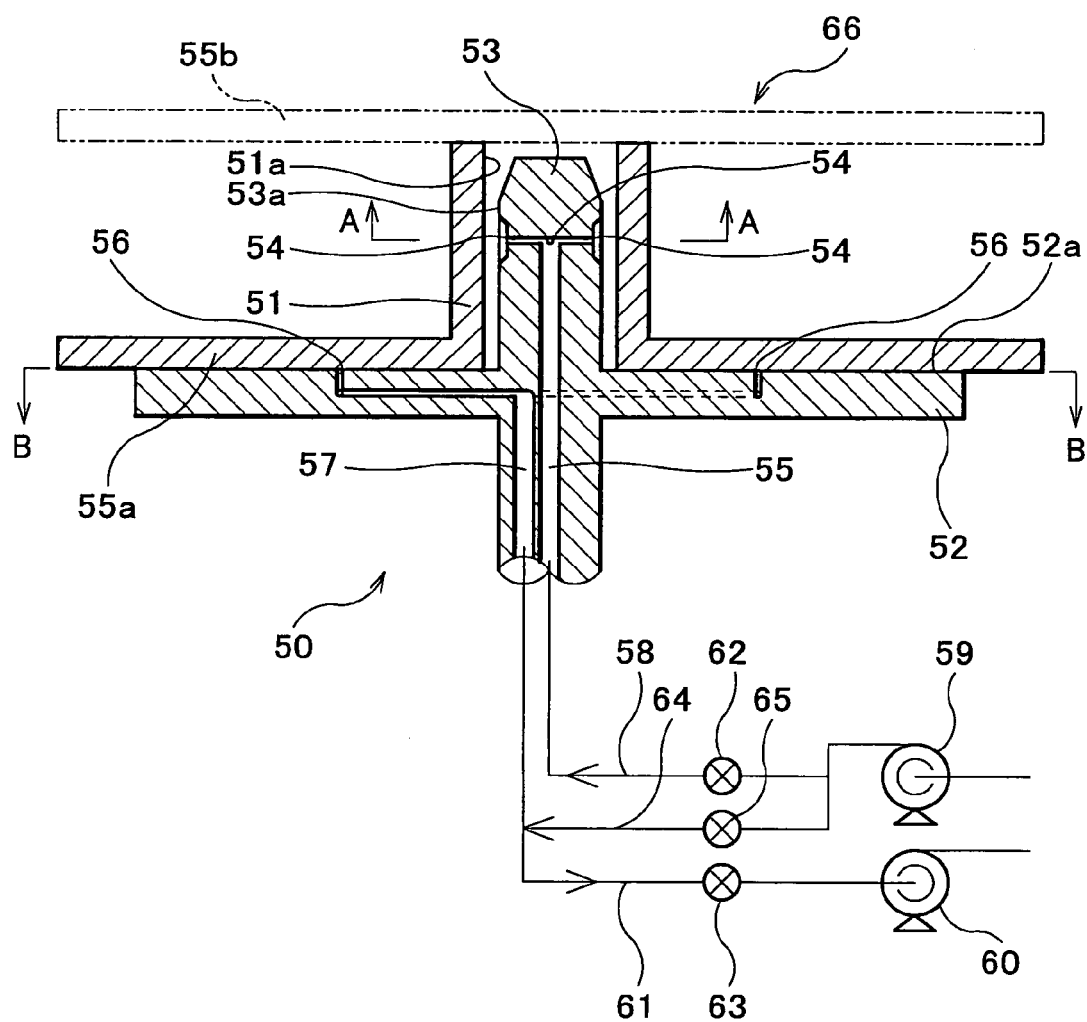
FIG. 11 is a sectional view showing a constitution of a positioning device.
Figure 12:
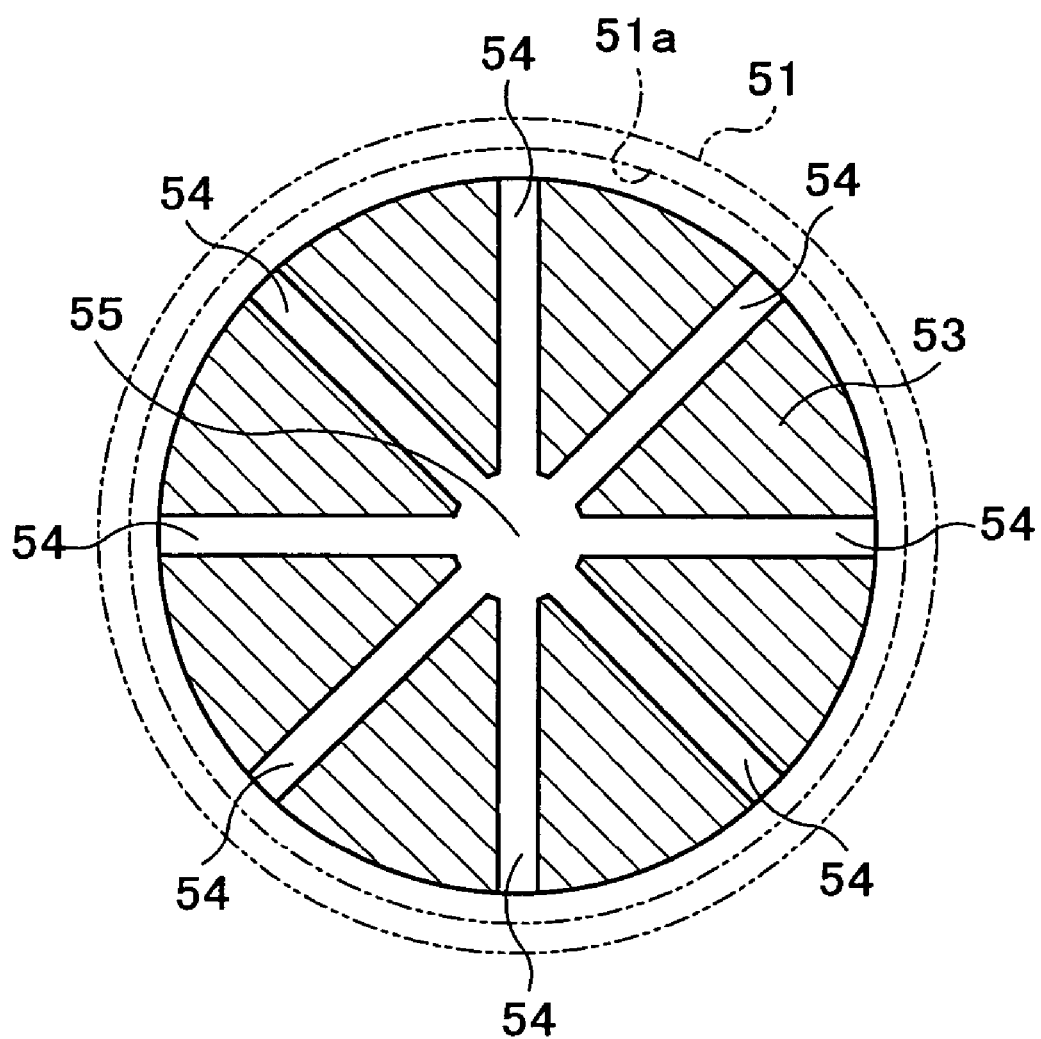
FIG. 12 is a sectional view taken along the line A—A of FIG. 11.
Figure 13:
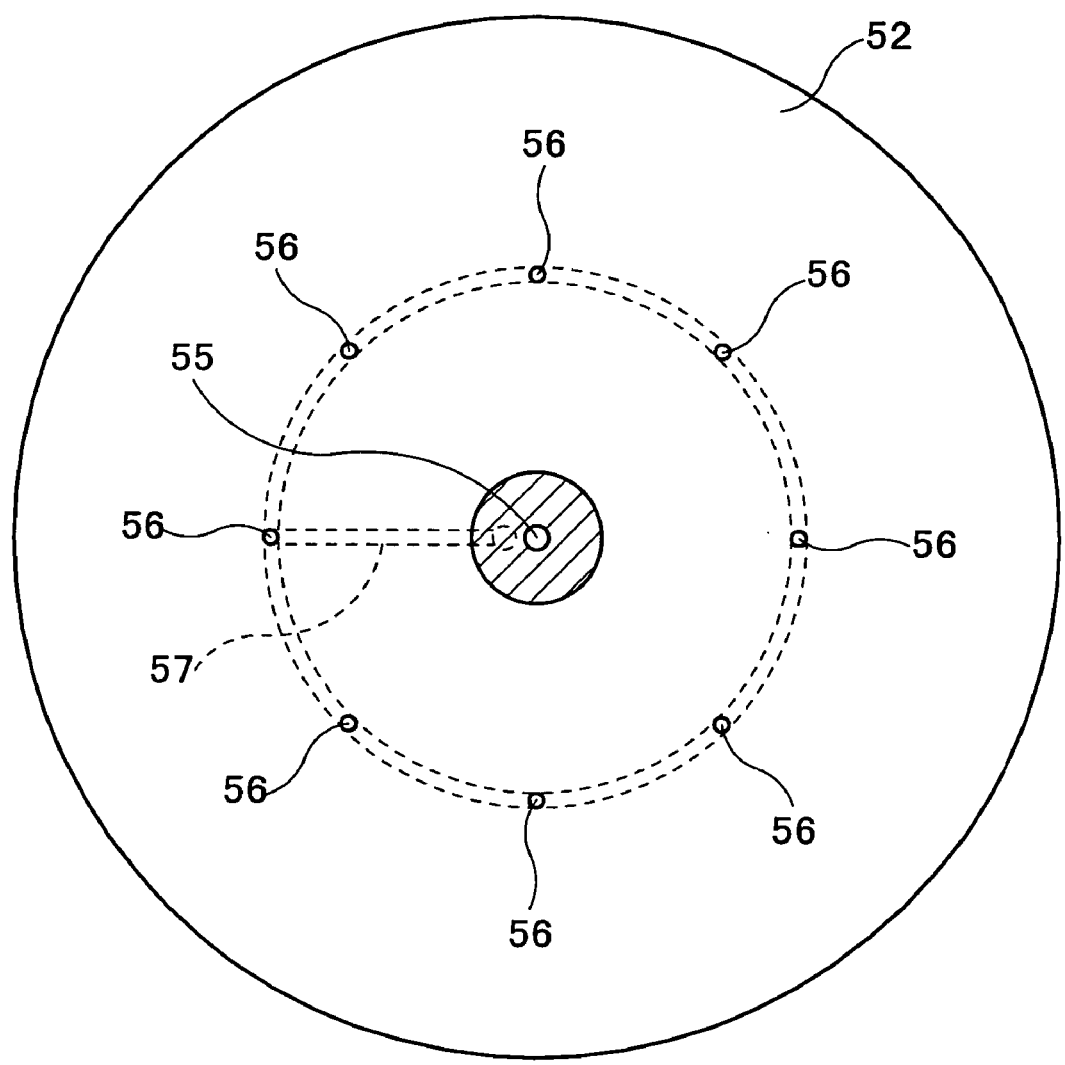
FIG. 13 is a sectional view taken along the line B—B of FIG. 11.

FIG. 11 is a sectional view showing a constitution of the positioning device according to this invention, FIG. 12 is a sectional view taken along the line A—A of FIG. 11, and FIG. 13 is a sectional view taken along the line B—B of FIG. 11.

As shown in FIG. 11 to FIG. 13, a positioning device 50 is constituted including a table 52 for positioning a hub 51, and a guide pin 53 erected on the table 52. The guide pin 53 is formed with a diameter of allowing a maximum of 50 μm of gap between inner periphery surface of a mounting hole 51a and outer periphery surface 53a of the guide pin 53. On the outer peripheral surface of the guide pin 53, pluralities of injection pores 54, 54 . . . open in a facing manner toward a facing surface to the inner periphery surface of the mounting hole 51a. Mutually the same opening area is formed for each injection hole 54, 54 . . . , and guide pins are formed at equal intervals in the peripheral direction and in the same position in the axial direction. And each injection hole 54, 54 . . . is connected to an internal passage 55 in the guide pin 53. For this reason, the hub 51 can be moved to the aligning position centering on the guide pin 53.

Further, a negative pressure suction port 56 opens on the placement surface 52a of the table 52 in order to absorb the flange 55a which is integrally formed with the hub 51, and the negative pressure suction port 56 is connected to a negative pressure passage 57. A fluid supply device 59 that supplies fluids such as air, water, or the like through a passage 58 is connected to the other end of the internal passage 55, and a negative pressure generating device 60 for generating negative pressure such as an ejector pump, a vacuum pump, or the like is connected to the negative pressure passage 57 through a pipeline 61. And the opening-and-closing valves 62 and 63 are interposed in each pipeline 58 and 61, respectively so as to be freely opened and closed.

Next, when the flange 55b is welded to the hub 51, so as to be integrally formed therewith, a mounting hole 51a of the hub 51 is fitted into the guide pin 53 of the table 52 to be placed on the table 52. In this state, the hub 51 can move in the axial direction in a maximum range of 50 μm to the guide pin 53.

The negative pressure generating device 60 is suspended in this state, to thereby close an opening-and-closing valve 63 of the negative generating device 60 side, whereas the fluid supply device 59 is started, to thereby open an opening-and-closing valve 62 of the fluid supply device 59 side.

When the fluid supply device 59 is started, a predetermined pressure of fluid, such as air and water, are supplied to the internal passage 55. Fluid is supplied from a fluid storage tank (not shown) connected to the fluid supply device 59. As described above, the opening area of each injection pore 54, 54 . . . is equally formed, and the position of each injection pore 54, 54 . . . in the axial direction is also equally formed. For this reason, the fluid injected from each injection pore 54, 54 . . . is brought into press contact with the inner periphery surface of the hub 51 by the same pressure, to thereby make reaction force act on the inner periphery surface of the mounting hole 51a.

If the fluid is injected from each injection pore 54 and 54 - - - , the hub 51 initially repeats a movement of front and rear, right and left in the radius direction by the pressure of the fluid injected from each injection pore 54 and 54 - - - . If the pressure is equalized and balance is maintained, the hub 51 stops at the position of 25 μm of interval between the inner periphery surface of the mounting hole 51a and the outer periphery surface 53a of the guide pin 53. This position corresponds to an aligning position of the hub 51 over the guide pin 53. In this case, the pipeline 58 are connected to the pipeline 61 by another pipeline 64, and an opening-and-closing valve 64 is inserted into a pipeline 59, so that the fluid may be supplied to the negative pressure suction port 56. In this state, if positive pressure is applied from the fluid supply device 59, making the opening-and-closing valve 65 of the negative pressure suction port 56 into an opening state at the time of the aligning, the aligning of the hub 51 can be facilitated.

If the fluid is injected from each injection port 54, 54 . . . , and the negative pressure generating device 60 is started to open the opening-and-closing valve 63, so that the negative pressure may be generated in the negative pressure suction port 56, while maintaining the hub 51 in an aligning position, the flange 51a of the hub 51 is absorbed into the table 52. In a state of integrally formed with the table 52, while maintaining the above state, the fluid supply device 59 is stopped to close the opening-and-closing valve 62 of the fluid supply device 59 side.

Next, a chuck and a spindle are moved toward the table 52. Then, by the above movement, the flange 55b is brought into contact with end face of the hub 51. And in this state, when the flange 55b is welded to the end face of the hub 51 by an ultrasonic wave welding apparatus, a reel 66 integrally having the flange 55a and 55b therewith is formed on both ends.

Figure 14A:
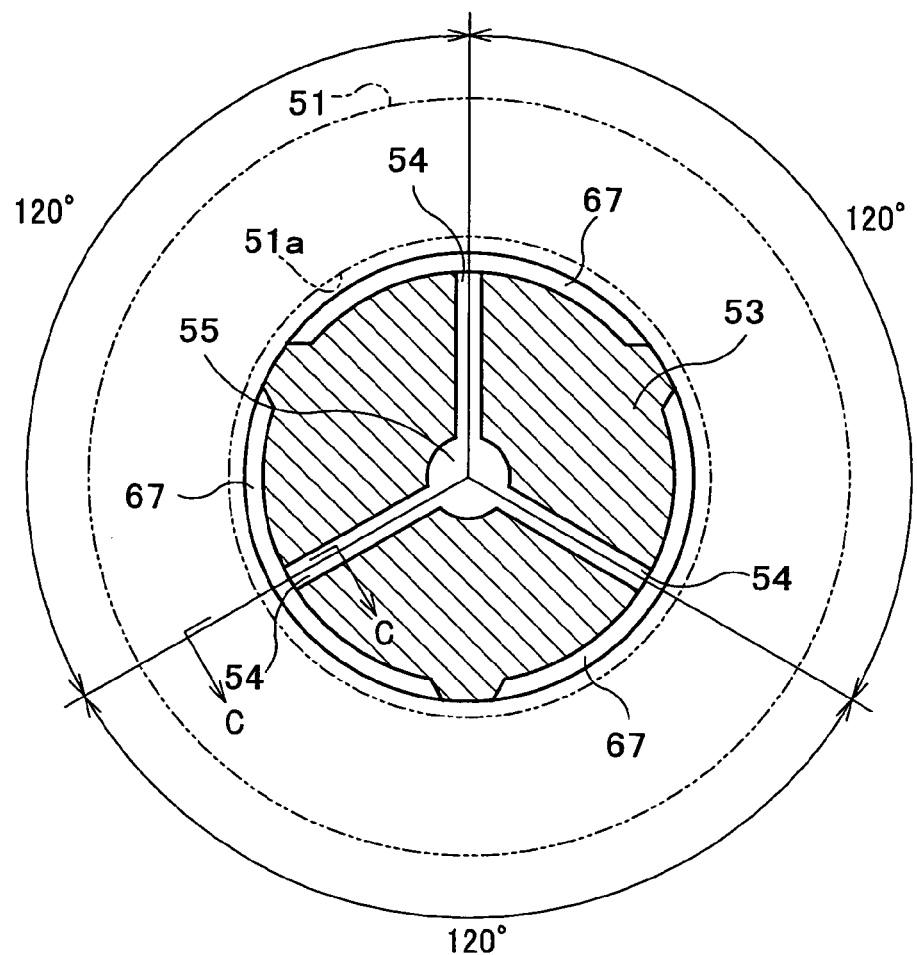
FIG. 14A is a sectional view of an injection pore that intersects perpendicularly in the axial direction.
Figure 14B:
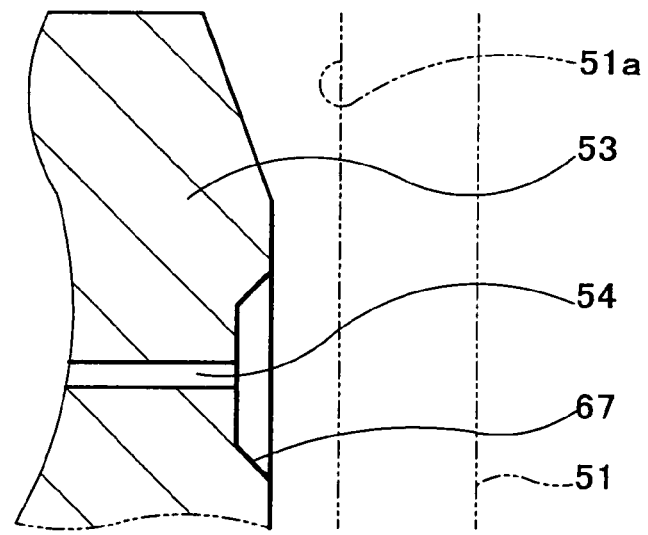
FIG. 14B is a sectional view taken along the line C—C of FIG. 14A.

FIG. 14 is a view showing a preferable example of formation of the injection ports 54, 54 . . . . In one of the embodiments described above, pluralities of injection ports 54, 54 . . . were provided at the same intervals in the peripheral direction of the guide pin 53, and in the same position in the axial direction, so that the hub 51 may be moved to the aligning position centering on the guide pin 53 by the pressure of the fluid. However, the number of the injection ports 54 is preferably three, in order to raise the stability of the pressure balance.

Here, a hollow 67 that extends along the peripheral direction of an outer periphery surface 53a of the guide pin 53 is formed at intervals of 120 degrees. And each injection port 6 is opened in a center of each hollow 67 in the periphery direction.

An opening area of each injection port 54, 54, 54 is equally formed as described above, connecting to the internal passage 55, and each hollow 67, 67, 67 is formed into a dome shape sequentially toward the inner peripheral surface of the mounting hole 51a from the center of the guide pin 53, in order to inject the fluid in a dome shape over the inner periphery surface of the hub 51. Thus, the pressure of the fluid injected from three injection pores 54, 54, and 54 is equalized on the inner periphery surface of the mounting hole 51a, therefore the hub 51 can be moved to the aligning position in a short time so as to be stably held.

Figure 15:
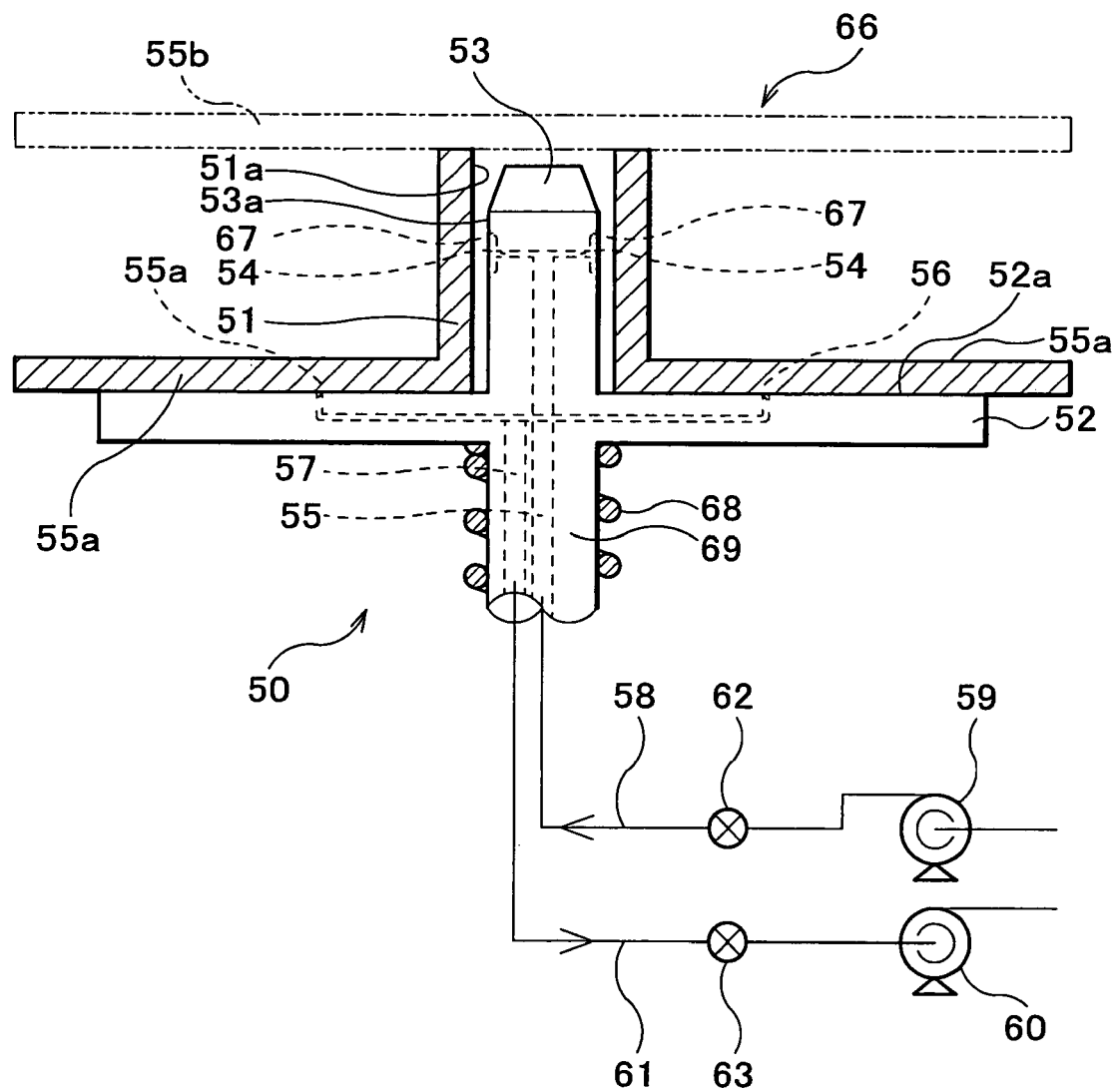
FIG. 15 is a sectional view showing a state in which the table is supported by a return spring so as to position a hub by fluids injected from each injection pore, in a seated state of the flange on end face of the hub.

FIG. 15 is a view showing a state in which the table 52 is supported by a return spring 68, and the flange 55b is seated on the end face of the hub 51 by the chuck or spindle, and in this state, the hub 51 is allowed to be positioned by the fluid injected from each injection port 54, 54, 54. According to FIG. 15, the return spring 68 is engageably mounted on the outer periphery surface of a pivot 69 attached on the undersurface of the table 52. Also, the table 52 is vertically movable along the axial direction of the pivot 69. Other constitution is the same as the constitution explained in FIG. 11 to FIG. 14. In a state in which the flange 55b that is welded to the end face of the hub 51 is moved to the table 52 by the chuck or spindle, and brought into contact state with the end face of the hub 51, the flange 55b, serving as a lid, close a gap between the outer periphery surface 53a of the guide pin 53, and the inner surface of the mounting hole 51a.

In the above state, the fluid supply device 59 is started to open the opening-and-closing valve 62 of the fluid supply device 59 side, then the negative pressure generating device 60 is stopped to close the opening-and-closing valve of the negative pressure generating device 60 side. A predetermined pressure of fluid is thus supplied to each injection port 54, 54, 54. In this state, since there is no exit of fluid in the gap, the pressure in the gap rises gradually. If the pressure in the gap extends over the whole peripheral surface to be equalized, the hub 51 is moved to the aligning position centering on the guide pin 53 to be held in this position. Thereafter, when the pressure in the gap rises, and the table 52 is lowered by the pressure of the fluid that acts on the table 52 against resilient force of the return spring 68, the fluid supplied to the gap subsequently is partially purged outside through the placement surface 52a of the table 52 and the flange 55b. However, the pressure in the gap is maintained uniformly still more, the hub 51 is held in the aligning position centering on the guide pin 53.

In the above state, the negative pressure generating device 60 is started to open the opening-and-closing valve 63, and the negative pressure is generated in the negative pressure suction port 56 on the table 52. Thereby, the flange 55a integrally formed with the hub 51 is absorbed into the table 52. In this state, the fluid supply device 59 is stopped to close the opening-and-closing valve 62 of the fluid supply device 59 side, and the flange 55b is welded onto the end face of the hub 51 by the ultrasonic wave welding. Thereby the reel 66 integrally having the flanges 55a and 55b on both sides is formed.

Here, when the positioning device is compared with the positioning device 50 explained in FIG. 11 to FIG. 14, the hub 51 is stably held in the aligning position, to thereby raise positioning accuracy of the flange 55b to the hub 51. Incidentally, here, the flange 55b is used as a lid. However, after using a lid of exclusive use and adsorbing a hub 2 by negative pressure, the flange 55b may be welded onto the end face of the hub 51. In order to enlarge the floating power and adsorption power, each suction port 56 may be made into a long-hole along the circumferential direction, or may be formed in annular grooves extending the whole circumference so as to mutually connect each injection hole 56 in the circumferential direction.

Also, when the fluid partially purged from the gap between the table 52 and the flange 55a integrally formed with the hub 51, not only the improvement in the positioning accuracy of the hub 51 but also the overloaded condition of the fluid supply device 59 can be prevented. In addition, a relief valve (not shown) may be provided in the pipeline 58 for supplying fluid, to thereby prevent the overload of the fluid supply device 59.

Figure 16:
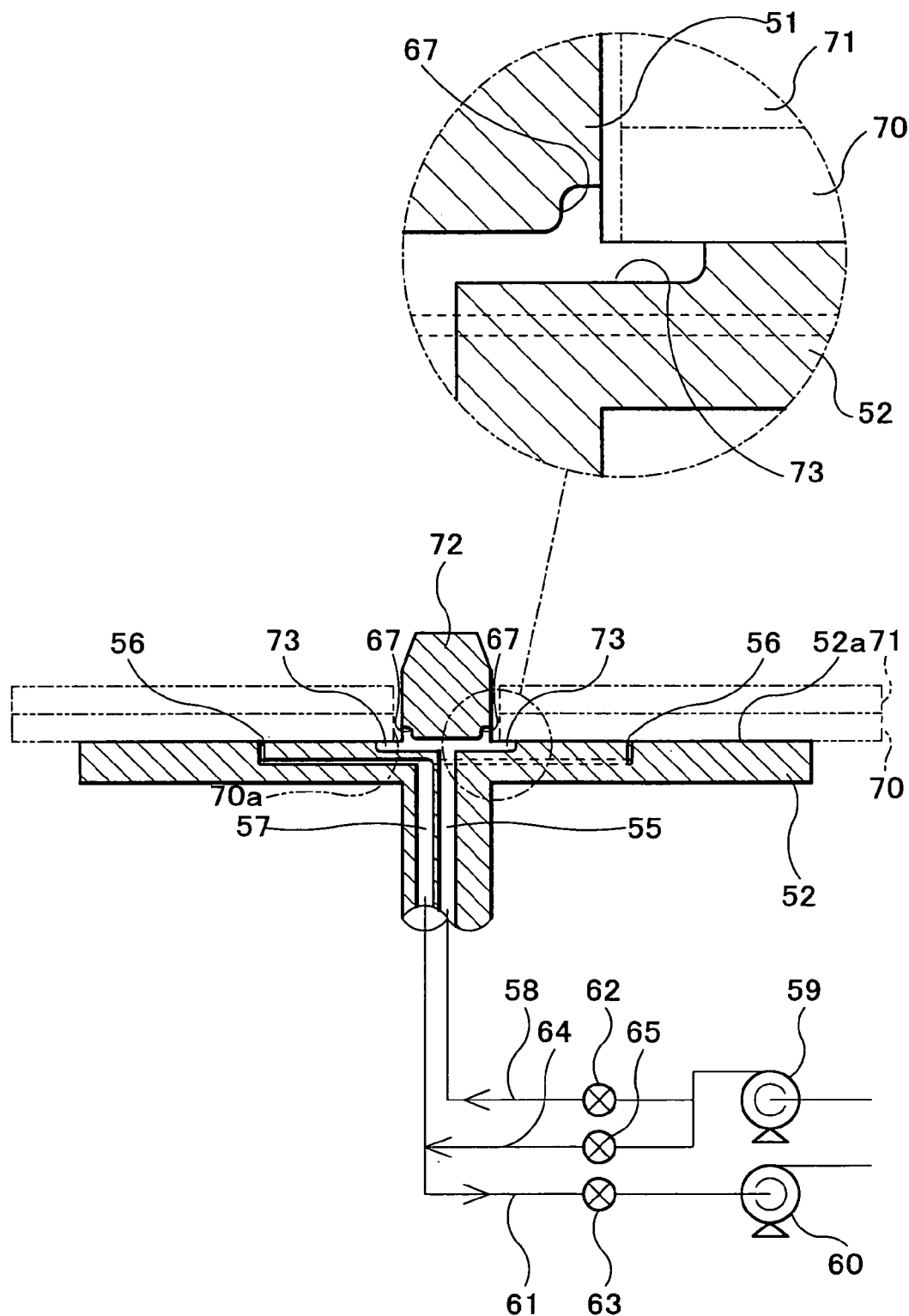
FIG. 16 is a sectional view showing a case in which two sheets of disks are laminated mutually to produce one sheet of disk.

In addition, as shown in FIG. 16, the positioning device 50 is also used as a positioning device of one sheet of disk made by mutually laminating two sheets of disk such as DVD (Digital Versatile Disk). Incidentally, here, the components and portions of the same designation as those explained above, are designated the same numeral and signs, omitting and simplifying the overlapping explanation.

In FIG. 16, designation 70 denotes a disk for positioning to the table 52, and designation 71 denotes a disk for laminating on the disk 70. Here, axial length and a journal of the guide pin 72 correspond to a hole diameter of the mounting hole 70a formed in center of the disk 70. And the maximum gap in the direction of diameter is about 50 im. The disk 70 is thin, and length of the mounting hole 70a of the disk 70 compared with the guide pin 72 in the axial direction is extremely short. For this reason, the hollow 67 is formed in the connection part of the guide pin 72 and the table 52, and the second hollow 73 is formed on the placement surface 52a (upper surface) of the table 52 connecting to the hollow 67. The hollow 67 and the second hollow 73 are formed at intervals of 120 degrees like FIG. 14, and each injection hole 54 opens (not shown) in the center of each hole 67 in the circumferential direction.

The opening area of each injection port 54 is mutually the same, connecting to the internal passage 55 in the guide pin 72. Also, on the table 52, as described before, the negative pressure suction port 56 and the negative pressure passage 57 are formed.

The fluid supply device 59 that supplies fluid, such as air and water, through the pipeline 58 is connected to the other end of the internal passage 55. The negative pressure generating device 60 is connected to the negative pressure passage 57 so that the negative pressure may act through the pipeline 61. And on the downstream side of each passage 58, 61, the opening-and-closing valves 62, 63 are interposed so as to be freely opened and closed.

When positioning a pair of disks 70 and 71, and laminating by an adhesive to form one sheet of disk, first, the mounting hole 70a of the disk 70 is fitted into the guide pin 72, and the other disk is attached to the chuck or the spindle, to thereby enable a joint of the disk 70 and the other disk 71.

In the above state, similarly to the case of the hub 51, the negative pressure generating device 60 is stopped to close the opening-and-closing valve 63 of the negative pressure generating device 60 side, to thereby start the fluid supply device 59 to open the opening-and-closing valve 62 of the fluid supply device 59 side.

When the fluid supply device 60 is started, a predetermined pressure of fluid, such as air and water are supplied to the internal passage 7. The opening area of each injection port 54, 54, 54 is equally formed, and the position of each injection port 54, 54, 54 in the axial direction is also equally formed.

Therefore, the pressure of the fluid injected from the three injection pores 54, 54, 54 is equalized over the inner periphery surface of the mounting hole 70a of the disk 70. In addition, when the fluid enters into between the fluid supplied to the second hollow 73 connecting to the hollow 67, and the undersurface of the disk 70, floating power and urging force in the outer peripheral direction are applied to the disk 70. By the pressure of the fluid injected from each injection hole 54, 54, 54, through the hollow 67, the disk 70 is moved to the aligning position centering on the guide pin 72 to be held in this position.

In this position, the negative pressure generating device 60 is started to open the opening-and-closing valve 63 of the negative pressure generating device 60 side, to thereby generate the negative pressure so as to act on the negative pressure suction port 56. The disk 70 is thus absorbed into the table 52. In an absorbed state of the disk 70 into the table 52, the fluid supply device 59 is stopped, and the opening-and-closing valve 62 of the fluid supply device 59 side is closed.

Next, an adhesive is applied to at least either of the disk 70 of the table 52 side or the disk 71 of the chuck or spindle side. And in this state, the chuck or the spindle is moved toward the table 52 to be bonded together. One sheet of disk laminated by a pair of disks 70 and 71 is thus formed.

Incidentally, the positioning device of the hub 51 and the positioning device of the disk 70 were explained as the positioning device of the hub 51 and the disk 70, respectively. However, the positioning device is not limited thereto, but applied to the positioning device for detecting the deflection of the flanges 55a and 55b, or the hub 51, or the positioning device for detecting modification and difference in thickness of the disk 70, 71. In addition, in this case, the deflection or the modification can be measured by a sensor consisting of a light projector and a light receiver.

What is claimed is:

1. A tape reel inspection device for inspecting a position of each
flange on inner diameter side or outer diameter side of flanges, distance between flanges, and an inclined angle of inner surface of each flange in a tape reel having a pair of disk-shaped flanges fixed to both ends of a cylindrical hub, comprising:

a rotator that rotates the tape reel in a circumferential direction of the flanges centering on the hub;

a first light projector that irradiates a first parallel light that passes a first measuring point set up on the inner diameter side of the inner surface of one of the flanges, and a second parallel light that passes a second measuring point set up on the inner diameter side of the inner surface of the other flange, so that the first measuring point and the second measuring point are in the same position in an axial direction of the flanges;

a first light receiver that receives the first parallel light that passes the first measuring point and the second parallel light that passes the second measuring point, and obtains the first measuring point and the second measuring point based on the receiving position of the first parallel light and the second parallel light;

a second light projector that irradiates a third parallel light that passes a third measuring point set up on the outer diameter side of the inner surface of the flange, and a fourth parallel light that passes a fourth measuring point set up on the outer diameter side of the inner surface of the flange so that the third measuring point and the fourth measuring point are in the same position in the axial direction of the flanges; and a second light receiver that receives the third parallel light that passes the third measuring point and the fourth parallel light that passes the fourth measuring point and obtains the third measuring point and the fourth measuring point based on the receiving position of the third parallel light and the fourth parallel light.

2. An inspection method using an inspection device described in claim 1, comprising the steps of:

irradiating the first, second, third, and fourth parallel lights toward the first, second, third, and fourth measuring points from the first light projector and the second light projector, while rotating the tape reel by the rotator;

receiving the first, second, third, and fourth parallel lights that pass the first, second, third, and fourth measuring points by the first light receiver and the second light receiver, and obtaining the first, second, third, and fourth measuring points based on the receiving positions of the first, second, third, and fourth parallel lights;

calculating a position of each flange on the inner diameter side of each flange and the distance between flanges, from the first measuring point and the second measuring point;

calculating a position of each flange on the outer diameter side of each flange and the distance between flanges, from the third measuring point and the fourth measuring point;

calculating an inclined angle of the inner surface of one of the flanges from the first measuring point and the third measuring point;

calculating an inclined angle of the inner surface of the other flange from the second measuring point and the fourth measuring point; and comparing the calculated position of each flange on the inner diameter side of the flange and distance between flanges, the calculated position of each flange on the outer diameter side of the flange and distance between flanges, an inclined angle of inner surface of one of the flanges, and the inclined angle of the inner surface of the other flange, with target values prepared beforehand, to thereby determine accuracy of the position of each flange on the inner diameter side or on the outer diameter side of the tape reel, the distance between flanges, and the inclined angle of the inner surface of each flange.

* * * * *